United States Patent
Nagai et al.

(10) Patent No.: US 11,340,245 B2
(45) Date of Patent: May 24, 2022

(54) TRANSPORT DEVICE, SAMPLE MEASUREMENT SYSTEM, AND TRANSPORT METHOD

(71) Applicants: SYSMEX CORPORATION, Kobe (JP); KAWASAKI JUKOGYO KABUSHIKI KAISHA, Kobe (JP)

(72) Inventors: Takaaki Nagai, Kobe (JP); Yuichiro Ohmae, Kobe (JP); Shinji Kamada, Kobe (JP); Toshiki Sato, Kobe (JP); Yukio Iwasaki, Kobe (JP); Satoshi Ouchi, Kobe (JP)

(73) Assignees: SYSMEX CORPORATION, Kobe (JP); KAWASAKI JUKOGYO KABUSHIKI KAISHA, Kobe (JP)

( * ) Notice: Subject to any disclaimer, the term of this patent is extended or adjusted under 35 U.S.C. 154(b) by 215 days.

(21) Appl. No.: 16/408,500

(22) Filed: May 10, 2019

(65) Prior Publication Data
US 2019/0346465 A1    Nov. 14, 2019

(30) Foreign Application Priority Data
May 11, 2018   (JP) .............................. JP2018-092215

(51) Int. Cl.
*G01N 35/00*   (2006.01)
(52) U.S. Cl.
CPC ..... *G01N 35/0099* (2013.01); *G01N 35/0095* (2013.01)
(58) Field of Classification Search
CPC ....................... G01N 35/0099; G01N 35/0095
See application file for complete search history.

(56) References Cited

U.S. PATENT DOCUMENTS

| 9,782,896 B2* | 10/2017 | Terada ................... B25J 9/162 |
| 10,908,173 B2* | 2/2021 | Yamasaki .......... G01N 35/0099 |
| 2002/0090320 A1 | 7/2002 | Burow et al. |
| 2003/0215936 A1* | 11/2003 | Kallioniemi ............ G01N 1/36 435/287.1 |
| 2006/0257999 A1 | 11/2006 | Chang et al. |
| 2009/0047179 A1* | 2/2009 | Ping ................... G01N 35/0095 422/72 |

(Continued)

FOREIGN PATENT DOCUMENTS

| EP | 2339355 A2 | 6/2011 |
| JP | S53-023691 A | 3/1978 |

(Continued)

OTHER PUBLICATIONS

The extended European search report dated Oct. 21, 2019 in a counterpart European patent application.

(Continued)

*Primary Examiner* — Michael Collins
(74) *Attorney, Agent, or Firm* — Metrolex IP Law Group, PLLC

(57) ABSTRACT

A transport device transports a container used in a sample measurement device or a rack housing the container. The transport device may include: a robotic arm configured to transport the container or the rack between a first sample measurement device and each of other sample measurement devices different from the first sample measurement device; and a controller that controls operation of the robotic arm.

20 Claims, 20 Drawing Sheets

(56) References Cited

U.S. PATENT DOCUMENTS

| | | |
|---|---|---|
| 2013/0128035 A1 | 5/2013 | Johns et al. |
| 2016/0069918 A1 | 3/2016 | Holmes et al. |
| 2017/0285052 A1 | 10/2017 | Tatsutani et al. |
| 2018/0035661 A1* | 2/2018 | Tanabe .................. G16H 10/40 |
| 2020/0164378 A1* | 5/2020 | Watanabe ............... B01L 3/527 |
| 2020/0209268 A1* | 7/2020 | Tajima ............. G01N 35/00732 |
| 2020/0264201 A1* | 8/2020 | Makino .............. G01N 35/0095 |

FOREIGN PATENT DOCUMENTS

| | | |
|---|---|---|
| JP | H08-29432 A | 2/1996 |
| JP | H09-54096 A | 2/1997 |
| JP | H09-243644 A | 9/1997 |
| JP | 2001-505648 A | 4/2001 |
| JP | 2004-511788 A | 4/2004 |
| JP | 2012-088190 A | 5/2012 |
| JP | 2016-164555 A | 9/2016 |

OTHER PUBLICATIONS

Communication pursuant to Article 94(3) EPC dated Mar. 7, 2022 in a counterpart European patent application.
Office Action (JPOA) dated Apr. 5, 2022 in a counterpart Japanese patent application.

* cited by examiner

TABLE AT HOST

| SAMPLE ID | MEASUREMENT ORDER |
|---|---|
| 1 | A |
| 2 | A |
| 3 | B |
| 4 | C |
| ⋮ | ⋮ |

FIG. 13

TABLE AT CONTROLLER OF TRANSPORT UNIT

| RACK ID | SAMPLE ID | ADDITIONAL MEASUREMENT ORDER |
|---|---|---|
| ① | 1 | a |
| ① | 2 | — |
| ① | 3 | b |
| ⋮ | ⋮ | ⋮ |
| ② | 11 | a,b |
| ② | 12 | c |
| ② | 13 | a,b,c |
| ⋮ | ⋮ | ⋮ |

FIG. 14

TABLE AT CONTROLLER OF ROBOT ARM

| POSITION INFORMATION | PRIORITY LEVEL | NUMBER OF TIMES OF TRANSFER |
|---|---|---|
| RACK ACCUMULATION UNIT (x1,y1,z1) | — | |
| BACKWARD TRANSFER LINE (x2,y2,z2) | — | |
| SAMPLE MEASUREMENT DEVICE 30a CONVEYANCE-IN POSITION (x3,y3,z3) CONVEYANCE-OUT POSITION(x4,y4,z4) | 1 | N1 |
| SAMPLE MEASUREMENT DEVICE 30b CONVEYANCE-IN POSITION (x5,y5,z5) CONVEYANCE-OUT POSITION(x6,y6,z6) | 2 | N2 |
| SAMPLE MEASUREMENT DEVICE 30c CONVEYANCE-IN POSITION (x7,y7,z7) CONVEYANCE-OUT POSITION(x8,y8,z8) | 3 | N3 |

FIG. 15

TABLE AT HOST

| SAMPLE ID | MEASUREMENT ORDER | ADDITIONAL MEASUREMENT ORDER |
|---|---|---|
| 1 | A | a |
| 2 | A | a,b,c |
| 3 | B | a,b,c,d |
| 4 | C | a,b,c,d,e |
| ⋮ | ⋮ | ⋮ |

FIG. 22

TABLE AT CONTROLLER OF TRANSPORT UNIT

| RACK ID | SAMPLE ID | ADDITIONAL MEASUREMENT ORDER | KIND OF SAMPLE MEASUREMENT DEVICE |
|---|---|---|---|
| ① | 1 | a | a1 |
| ① | 2 | a,b,c | a1,b1,c1 |
| ① | 3 | a,b,c,d | a1,b1,c1,d1 |
| ⋮ | ⋮ | ⋮ | ⋮ |
| ② | 11 | a,b | a1,b1 |
| ② | 12 | -- | -- |
| ② | 13 | a,b,c,d,e | a1,b1,c1,d1,e1 |
| ⋮ | ⋮ | ⋮ | ⋮ |

FIG. 23

TABLE AT CONTROLLER OF ROBOT ARM

| POSITION INFORMATION | PRIORITY LEVEL | NUMBER OF TIMES OF TRANSFER |
|---|---|---|
| RACK ACCUMULATION UNIT (x1,y1,z1) | — | |
| BACKWARD TRANSFER LINE (x2,y2,z2) | — | |
| SAMPLE MEASUREMENT DEVICE 30d<br>CONVEYANCE-IN POSITION (x9,y9,z9)<br>CONVEYANCE-OUT POSITION (x10,y10,z10) | 1 | N4 |
| SAMPLE MEASUREMENT DEVICE 30e<br>CONVEYANCE-IN POSITION (x11,y11,z11)<br>CONVEYANCE-OUT POSITION (x12,y12,z12) | 2 | N5 |
| SAMPLE MEASUREMENT DEVICE 30f<br>CONVEYANCE-IN POSITION (x13,y13,z13)<br>CONVEYANCE-OUT POSITION (x14,y14,z14) | 3 | N6 |
| SAMPLE MEASUREMENT DEVICE 30g<br>CONVEYANCE-IN POSITION (x15,y15,z15)<br>CONVEYANCE-OUT POSITION (x16,y16,z16) | 4 | N7 |
| SAMPLE MEASUREMENT DEVICE 30h<br>CONVEYANCE-IN POSITION (x17,y17,z17)<br>CONVEYANCE-OUT POSITION (x18,y18,z18) | 5 | N8 |
| SAMPLE MEASUREMENT DEVICE 30i<br>CONVEYANCE-IN POSITION (x19,y19,z19)<br>CONVEYANCE-OUT POSITION (x20,y20,z20) | 6 | N9 |

FIG. 24

TRANSPORT DEVICE, SAMPLE MEASUREMENT SYSTEM, AND TRANSPORT METHOD

CROSS REFERENCE TO RELATED APPLICATIONS

This application claims priority to prior Japanese Patent Application No. 2018-092215 filed with the Japan Patent Office on May 11, 2018, the entire contents of which are incorporated herein by reference.

BACKGROUND

The disclosure relates to a transport device, a sample measurement system, and a transport method.

A transport device that transports a rack housing containers among multiple sample measurement devices is known. For example, Japanese Patent Application Publication No. H09-54096 (Patent Literature 1) discloses a transport device 900 including: a transport line 920 including a transport belt 921 that transports a rack 910 housing a container 911 among sample measurement devices 901, 902, and 903; and a turntable 922 configured to change the orientation of the rack 910, as illustrated in FIG. 28.

In the above-described conventional transport device 900 according to Patent Literature 1, the rack 910 is transported by the transport line 920 including the transport belt 921. For this reason, when the sample measurement device 901, 902, and 903 are connected with each other through the transport line 920, the sample measurement devices 901 to 903 need to be arrayed along the transport line 920. Thus, connecting a larger number of sample measurement devices 901 to 903 leads to a larger installation width in the array direction and a lower freedom of installation. As a result, use of the conventional transport device has problems of a large installation width of the sample measurement devices in the array direction, and difficulty in increasing the freedom of installation of the sample measurement devices. In addition, although the orientation of the rack 910 in the horizontal direction can be changed by using the turntable 922, it is difficult to transport the rack 910 when the sample measurement devices 901 to 903 have different height levels to which the rack 910 is to be transported. Thus, the sample measurement devices 901 to 903 need to be arranged to have the equal transport height levels for the rack.

One or more aspects aim to eliminate the need to align the transport height levels of a container or a rack and increase the freedom of installation of sample measurement devices while preventing increase of an installation width of the sample measurement devices in an array direction.

SUMMARY OF THE INVENTION

A transport device according to one or more aspects may transport a container used in a sample measurement device or a rack housing the container. The transport device may include: a robotic arm configured to transport the container or the rack between a first sample measurement device and each of other sample measurement devices different from the first sample measurement device; and a controller that controls operation of the robotic arm.

A sample measurement system according to one or more aspects may include: a first sample measurement device; other sample measurement devices different from the first sample measurement device; and a transport device. The transport device may include: a robotic arm configured to transport a container used in a sample measurement device or a rack housing the container between the first sample measurement device and each of the other sample measurement devices; and a controller that controls operation of the robotic arm.

A transport method according to one or more aspects may be transporting a container used in a sample measurement device or a rack housing the container. The method may include: causing a robotic arm to transport the container or the rack between a first sample measurement device and each of other sample measurement devices different from the first sample measurement device.

BRIEF DESCRIPTION OF DRAWINGS

FIG. 13 is a diagram illustrating an exemplary table held at a host computer;

FIG. 14 is a diagram illustrating an exemplary table held at a controller of a transport unit;

FIG. 15 is a diagram illustrating an exemplary table held at a controller of a robotic arm;

FIG. 22 is a diagram illustrating an exemplary table held at a host computer;

FIG. 23 is a diagram illustrating an exemplary table held at a controller of a transport unit;

FIG. 24 is a diagram illustrating an exemplary table held at a controller of a robotic arm;

DETAILED DESCRIPTION

Figure 1:
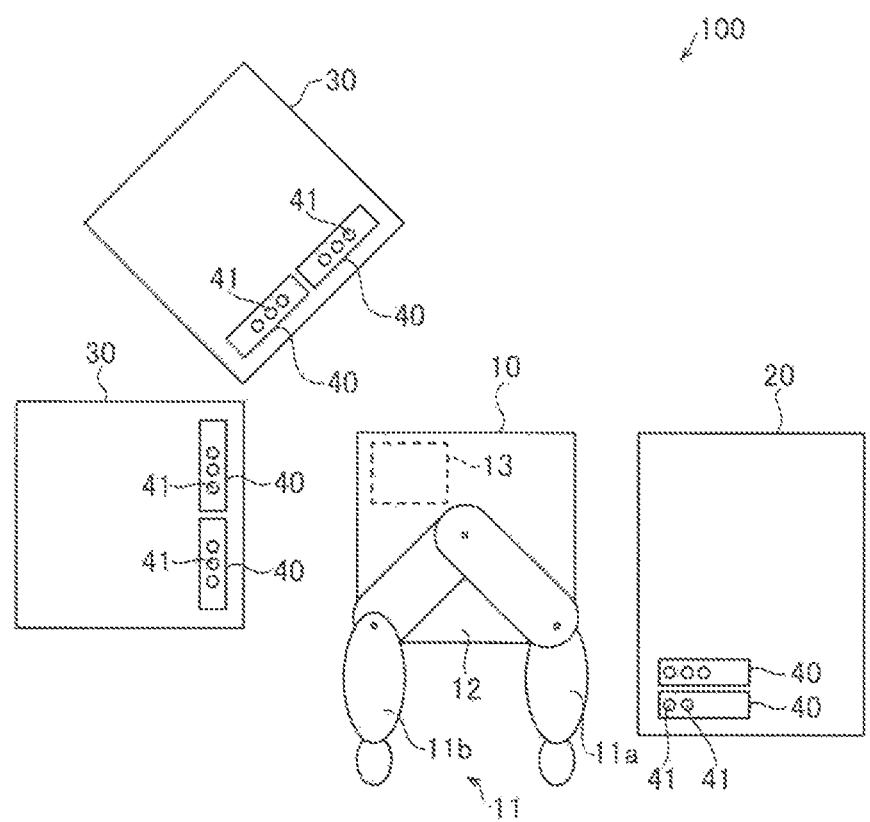
FIG. 1 is a schematic diagram illustrating a sample measurement system provided with a transport device according to a first embodiment.

A transport device 10 according to a first aspect is a transport device that transports a container 41 used in a sample measurement device or a rack 40 housing the container 41, and including a robotic arm 11 that transports the container 41 or the rack 40 between a first sample measurement device 20 and each of other sample measurement devices 30 different from the first sample measurement device 20; and a controller 13 that controls operation of the robotic arm 11.

In the transport device 10 according to a first aspect, since the container 41 or the rack 40 can be transported by the robotic arm 11 between the first sample measurement device 20 and each of the other sample measurement devices 30, the first sample measurement device 20 and the other sample measurement devices 30 do not need to be arrayed along a transport device such as a belt conveyer. Accordingly, the first sample measurement device 20 and the other sample measurement devices 30 can be freely positioned in the range of operation of the robotic arm 11, and thus the freedom of installation of sample measurement devices can be increased. In addition, the other sample measurement devices 30 do not need to be positioned straight relative to the first sample measurement device 20, and thus increase of the installation width of sample measurement devices in the array direction can be prevented. In addition, the transport height levels of the container 41 or the rack 40 do not need to be aligned among the first sample measurement device 20 and the other sample measurement devices 30. As a result, the need to align the transport height levels of the container 41 or the rack 40 can be eliminated and the freedom of installation of sample measurement devices can be increased while preventing increase of the installation width of the sample measurement devices in the array direction.

In the transport device 10 according to a first aspect, it may be preferable that the controller 13 controls the operation of the robotic arm 11 based on position information of a transport source and a transport destination of the container 41 or the rack 40. With this configuration, the robotic arm 11 can be operated through position adjustment by the controller 13, and thus the container 41 or the rack 40 can be accurately transported without accurately positioning and installing a base 12 supporting the robotic arm 11 relative to the first sample measurement device 20 and the other sample measurement devices 30.

In the transport device 10 according to a first aspect, it may be preferable that the controller 13 receives signals from the other sample measurement devices 30 and controls the operation of the robotic arm 11 based on the received signals. With this configuration, the container 41 or the rack 40 can be transported by the robotic arm 11 in accordance with a request for conveyance of the container 41 or the rack 40 out of or into each of the other sample measurement devices 30.

In the transport device 10 according to a first aspect, it may be preferable that the controller 13 receives a signal from an external control system and controls the operation of the robotic arm 11 based on the signal received from the external control system. With this configuration, when the transport device 10 is provided as an independent device, the first sample measurement device 20 and the other sample measurement devices 30 can be cooperated based on the signal from the external control system.

In this case, it may be preferable that the controller 13 controls the operation of the robotic arm 11 to transport the container 41 or the rack 40 to one of the other sample measurement devices 30 based on transport destination information included in the signal received from the external control system. With this configuration, it is possible to easily determine the transport destination based on the transport destination information and transport the container 41 or the rack 40.

In the transport device 10 having the above-described configuration in which the controller 13 controls the operation of the robotic arm 11 based on the signal received from the external control system, it may be preferable that the external control system controls a transport conveyer that transports the container 41 or the rack 40 to the first sample measurement device 20. With this configuration, the external control system can collectively control transport operation of the transport conveyer and transport operation of the robotic arm 11.

In the transport device 10 according to a first aspect, it may be preferable that the controller 13 determines one of the other sample measurement devices 30 to which the container 41 or the rack 40 is to be transported based on at least one of the number of times of transport to each of the other sample measurement devices 30 and a priority level of each of the other sample measurement devices 30. With this configuration, it is possible to prevent occurrence of use frequency imbalance among the other sample measurement devices 30.

In this case, it may be preferable that the controller 13 determines the other sample measurement device 30 to which the container 41 or the rack 40 is to be transported to be the other sample measurement device 30 with the smallest number of times of transport among the other sample measurement devices 30, and determines the other sample measurement device 30 to which the container 41 or the rack 40 is to be transported based on the priority level in a case in which there are two or more other sample measurement devices 30 with the smallest same number of times of transport. With this configuration, it is possible to equally use the other sample measurement devices 30, and thus it is possible to effectively prevent occurrence of use frequency imbalance among the other sample measurement devices 30.

In the transport device 10 having the above-described configuration in which the other sample measurement device 30 to which the container 41 or the rack 40 is to be transported is determined based on at least one of the number of times of transport and the priority level, it may be preferable that, when the container 41 or the rack 40 is transported to any of the other sample measurement devices 30, the controller 13 performs control to lower the priority level of the other sample measurement device 30 to which the container 41 or the rack 40 is transported. With this configuration, it is possible to effectively prevent occurrence of use frequency imbalance among the other sample measurement devices 30.

In the transport device 10 according to a first aspect, it may be preferable that the other sample measurement devices 30 includes at least a second sample measurement device and a third sample measurement device, and the robotic arm 11 is capable of transporting the container 41 or the rack 40 between the second sample measurement device and the third sample measurement device. With this configuration, it is unnecessary to redundantly provide a dedicated device for passing over the container 41 or the rack 40 between the second sample measurement device and the third sample measurement device, which leads to a simplified device configuration.

In the transport device 10 according to a first aspect, it may be preferable that the other sample measurement devices 30 perform measurement different from measurement performed by the first sample measurement device 20. With this configuration, the transport device 10 can transport the container 41 or the rack 40 between sample measurement devices configured to perform measurements different from each other.

In the transport device 10 according to a first aspect, it may be preferable that the robotic arm 11 transports the container 41 or the rack 40 to the other sample measurement devices 30 arranged circumferentially around the base 12 supporting the robotic arm 11. With this configuration, the distance to the robotic arm 11 can be made equivalent among the other sample measurement devices 30, and thus control of the robotic arm 11 to transport the container 41 or the rack 40 to each of the other sample measurement devices 30 can be performed in the same manner on the other sample measurement devices 30. Accordingly, it is possible to prevent complication of the control of the robotic arm 11.

In this case, it may be preferable that the robotic arm 11 transports the container 41 or the rack 40 to the other sample measurement devices 30 in each of which a supply unit 301 to which to supply the container 41 or the rack 40 is positioned facing the base 12. With this configuration, the other sample measurement devices 30 can be arranged surrounding the base 12 supporting the robotic arm 11, and thus the installation width of the other sample measurement devices 30 in the array direction can be reduced as compared to a case in which the other sample measurement devices 30 are linearly arranged.

In the transport device 10 according to a first aspect, it may be preferable that the base 12 supporting the robotic arm 11 is movable relative to an installation surface. With this configuration, the transport device 10 can be moved relative to the first sample measurement device 20 and the other sample measurement devices 30, and thus the transport device 10 can be freely positioned avoiding interference with another device or an operator. In addition, the transport device 10, the first sample measurement device 20, or the other sample measurement devices 30 can be moved for maintenance. Accordingly, each device does not need to be arranged with a gap provided between the device and another device or a wall to perform maintenance, it is possible to prevent increase of the installation area and increase the freedom of installation of sample measurement devices.

In this case, it may be preferable that the base 12 includes a caster 121 that moves the base 12 relative to the installation surface and an expandable and contractable fixation leg 122, and the base 12 is fixed to the installation surface when the fixation leg 122 is expanded so that the caster 121 floats above the installation surface. With this configuration, the base 12 supporting the robotic arm 11 can be easily moved by the caster 121 and easily fixed to the installation surface by the fixation leg 122.

In the transport device 10 according to a first aspect, it may be preferable that the robotic arm 11 includes drive units 116a, 116b, 116c, and 116d, and the controller 13 controls drive of the drive units 116a, 116b, 116c, and 116d to transport the container 41 or the rack 40 based on position information of a transport source and a transport destination. With this configuration, the drive units 116a, 116b, 116c, and 116d can be driven based on the position information to drive the robotic arm 11, and thus the container 41 or the rack 40 can be accurately transported with an increased freedom of transport of the container 41 or the rack 40.

It may be preferable that the transport device 10 according to a first aspect includes a hand that is provided in the robotic arm 11 in a replaceable manner and that grasps the container 41 or the rack 40. With this configuration, the container 41 or the rack 40 can be reliably held by hands 114 and 115 and transported. In addition, since the hands 114 and 115 can be replaced, the hands 114 and 115 suitable for holding the container 41 or the rack 40 can be selected in accordance with the shape of the container 41 and the shape of the rack 40 and attached to the robotic arm 11.

In the transport device 10 according to a first aspect, it may be preferable that the robotic arm 11 is provided with a hand configured to hold the container 41 or the rack 40, the hand includes a first hand 114 that grasps the container 41 or the rack 40 from above and a second hand 115 that grasps the container 41 or the rack 40 from side, and the first hand 114 and the second hand 115 are selectively used. With this configuration, the direction of grasping the rack 40 can be selected in accordance with the state of a position at which the rack 40 is passed over, and thus the rack 40 can be easily grasped by the first hand 114 and the second hand 115.

In the transport device 10 according to a first aspect, it may be preferable that the robotic arm 11 includes a first robotic arm 11a and a second robotic arm 11b, and the container 41 or the rack 40 can be handed over between the first robotic arm 11a and the second robotic arm 11b. With this configuration, the orientation of the container 41 or the rack 40 can be easily adjusted by handing over the container 41 or the rack 40. In addition, the first robotic arm 11a and the second robotic arm 11b can be selectively used in accordance with the state of a position at which the container 41 or the rack 40 is passed over, and thus the container 41 or the rack 40 can be easily passed over by the robotic arm 11 in accordance with the state of the position at which the container 41 or the rack 40 is passed over.

In the transport device 10 according to a first aspect, it may be preferable that the first sample measurement device 20 is provided with an ejection unit 202 through which the container 41 or the rack 40 is ejected or an accumulation unit 53 in which the container 41 or the rack 40 thus ejected is accumulated and the other sample measurement devices 30 are each provided with the supply unit 301 to which the container 41 or the rack 40 is supplied so that the container 41 or the rack 40 can be taken out from the ejection unit 202 or the accumulation unit 53 by the operator or the robotic arm 11 and the container 41 or the rack 40 can be transferred to the supply unit 301 by the operator or the robotic arm 11. With this configuration, the container 41 or the rack 40 can be taken out by the robotic arm 11 from the ejection unit 202 or the accumulation unit 53 from which the container 41 or the rack 40 is taken out by the operator, and the container 41 or the rack 40 can be passed over by the robotic arm 11 to the supply unit 301 to which the container 41 or the rack 40 is passed over by the operator, and accordingly, it is unnecessary to redundantly provide the ejection unit 202 and the supply unit dedicated to the robotic arm 11. Accordingly, a simplified device configuration can be achieved.

In the transport device 10 according to a first aspect, it may be preferable that the supply unit 301 and the ejection unit 202 or the accumulation unit 53 are arranged at positions which are different in the height level from the installation surface, and the robotic arm 11 transports the container 41 or the rack 40 from the ejection unit 202 or the accumulation unit 53 to the supply unit 301 having a different height from the installation surface. With this configuration, when the height is different between the supply unit 301 and the ejection unit 202 or the accumulation unit 53, the container 41 or the rack 40 can be transported without redundantly providing an elevation device. In addition, it is possible to easily combine and use measurement devices at heights different from each other, and thus it is possible to effectively increase the freedom of selection of the measurement devices.

In the transport device 10 according to a first aspect, it may be preferable that the robotic arm 11 stops operating when having contacted an object other than a transported object in operation. With this configuration, for example, it is possible to prevent large impact on the operator when the robotic arm 11 contacts the operator. In addition, it is possible to prevent an excessive load on the robotic arm 11.

In the transport device 10 according to a first aspect, it may be preferable that, when taking out the rack 40, the robotic arm 11 moves, at stages, a hand for grasping the rack 40 in a direction in which racks 40 are arranged to detect the rack 40, and when having detected the rack 40, holds the rack 40 with the hand. With this configuration, the rack 40 can be easily held and taken out with the hand 115 without accurately acquiring the position of the rack 40 before the rack 40 is taken out.

In this case, it may be preferable that the hand is provided with a non-contact sensor 1153 configured to detect the rack 40. With this configuration, the rack 40 can be reliably detected by the non-contact sensor 1153 without contact with the rack 40.

In the transport device 10 according to a first aspect, it may be preferable that, when taking out the container 41 or the rack 40, the robotic arm 11 presses to move the container 41 or the rack 40 and then holds the container 41 or the rack 40. With this configuration, when taken out while the position of the rack 40 is tilted, the rack 40 is pressed and moved so that the posture of the rack 40 can be adjusted, and thus the rack 40 can be prevented from being held while being tilted or from not being held.

In the transport device 10 according to a first aspect, it may be preferable that the first sample measurement device 20 is a blood cell measurement device, and the other sample measurement devices 30 are bacteria test devices. With this configuration, the container 41 or the rack 40 can be transported between the blood cell measurement device and each bacteria test device, and thus blood cell measurement and bacteria test can be both automatically and sequentially performed.

A sample measurement system 100 according to a second aspect includes: the first sample measurement device 20; the other sample measurement devices 30 different from the first sample measurement device 20; and the transport device 10 including the robotic arm 11 that transports the container 41 used in a sample measurement device or the rack 40 housing the container 41 between the first sample measurement device 20 and each of the other sample measurement devices 30, and the controller 13 that controls operation of the robotic arm 11.

In the sample measurement system 100 according to a second aspect configured as described above, since the container 41 or the rack 40 can be transported by the robotic arm 11 between the first sample measurement device 20 and each of the other sample measurement devices 30, the first sample measurement device 20 and the other sample measurement devices 30 do not need to be arrayed along a transport device such as a belt conveyer. Accordingly, the first sample measurement device 20 and the other sample measurement devices 30 can be freely positioned in the range of operation of the robotic arm 11, and thus the freedom of installation of sample measurement devices can be increased. In addition, the other sample measurement devices 30 do not need to be positioned straight relative to the first sample measurement device 20, and thus increase of the installation width of sample measurement devices in the array direction can be prevented. In addition, the transport height levels of the container 41 or the rack 40 do not need to be aligned between the first sample measurement device 20 and each of the other sample measurement devices 30. As a result, it is possible to provide the sample measurement system 100 capable of eliminating the need to align the transport height levels of the container 41 or the rack 40 and increasing the freedom of installation of sample measurement devices while preventing increase of the installation width of the sample measurement devices in the array direction.

A transport method according to a third aspect is a transport method of transporting the container 41 used in a sample measurement device or the rack 40 housing the container 41, and the method transports, by the robotic arm 11, the container 41 or the rack 40 between the first sample measurement device 20 and each of the other sample measurement devices 30 different from the first sample measurement device 20.

In the transport method according to a third aspect configured as described above, since the container 41 or the rack 40 can be transported by the robotic arm 11 between the first sample measurement device 20 and each of the other sample measurement devices 30, the first sample measurement device 20 and the other sample measurement devices 30 do not need to be arrayed along a transport device such as a belt conveyer. Accordingly, the first sample measurement device 20 and the other sample measurement devices 30 can be freely arranged in the range of operation of the robotic arm 11, and thus the freedom of installation of sample measurement devices can be increased. In addition, the other sample measurement devices 30 do not need to be arranged straight relative to the first sample measurement device 20, and thus increase of the installation width of sample measurement devices in the array direction can be prevented. In addition, the transport height levels of the container 41 or the rack 40 do not need to be aligned between the first sample measurement device 20 and each of the other sample measurement devices 30. As a result, it is possible to provide a transport method capable of eliminating the need to align the transport height levels of the container 41 or the rack 40 and increasing the freedom of installation of sample measurement devices while preventing increase of the installation width of the sample measurement devices in the array direction.

In the above-described transport method according to a third aspect, it may be preferable that operation of the robotic arm 11 is controlled based on position information of a transport source and a transport destination of the container 41 or the rack 40. With this configuration, the robotic arm 11 can be operated through position adjustment, and thus the container 41 or the rack 40 can be accurately transported without accurately positioning and installing the base 12 supporting the robotic arm 11 relative to the first sample measurement device 20 and the other sample measurement devices 30.

One or more aspects may eliminate the need to align the transport height levels of a container or a rack, and increase the freedom of installation of sample measurement devices while preventing increase of the installation width of the sample measurement devices in the array direction.

Embodiments will be described below with reference to the accompanying drawings.

(Overview of Transport Device)

The following describes overview of a transport device 10 with reference to FIG. 1.

The transport device 10 transports a container 41 used in a sample measurement device or a rack 40 housing or holding the container 41. The container 41 houses or contains a sample and is transported to a sample measurement device. The sample is a living body specimen collected from a sample body (subject), such as blood, urine, or cells.

As illustrated in FIG. 1, the transport device 10 is provided in a sample measurement system 100. The sample measurement system 100 includes the transport device 10, a first sample measurement device 20, and other sample measurement devices 30. The sample measurement system 100 is used in, for example, a clinical test. The sample measurement system 100 is provided in a hospital or a test facility.

The transport device 10 includes a robotic arm 11, a base 12, and a controller 13. The robotic arm 11 includes, for example, a first robotic arm 11a and a second robotic arm 11b. In other words, two of the robotic arms 11 are provided. The number of robotic arms 11 may be one or three or more. In one or more embodiments, the robotic arm 11 transports the container 41 or the rack 40 between the first sample measurement device 20 and each of the other sample measurement devices 30 different from the first sample measurement device 20. Specifically, the robotic arm 11 transports the rack 40 housing the container 41. The robotic arm 11 may directly hold and transport the container 41. The robotic arm 11 is capable of transporting the container 41 or the rack 40 in the horizontal direction and the vertical direction.

Accordingly, the container 41 or the rack 40 can be transported between the first sample measurement device 20 and each of the other sample measurement devices 30 by the robotic arm 11. Therefore, the first sample measurement device 20 and the other sample measurement devices 30 do not need to be arrayed along a transport device such as a belt conveyer. Accordingly, the first sample measurement device 20 and the other sample measurement devices 30 can be freely arranged in the range of operation of the robotic arm 11, and thus the freedom of installation of sample measurement devices can be increased. In addition, the other sample measurement devices 30 do not need to be arranged straight relative to the first sample measurement device 20, and thus increase of the installation width of sample measurement devices in the array direction can be prevented. In addition, the transport height levels of the container 41 or the rack 40 do not need to be aligned between the first sample measurement device 20 and each of the other sample measurement devices 30. As a result, it is possible to eliminate the need to align the transport height levels of the container 41 or the rack 40, and increase the freedom of installation of sample measurement devices while preventing increase of the installation width of the sample measurement devices in the array direction.

First Embodiment (Sample Measurement System)

Figure 2:
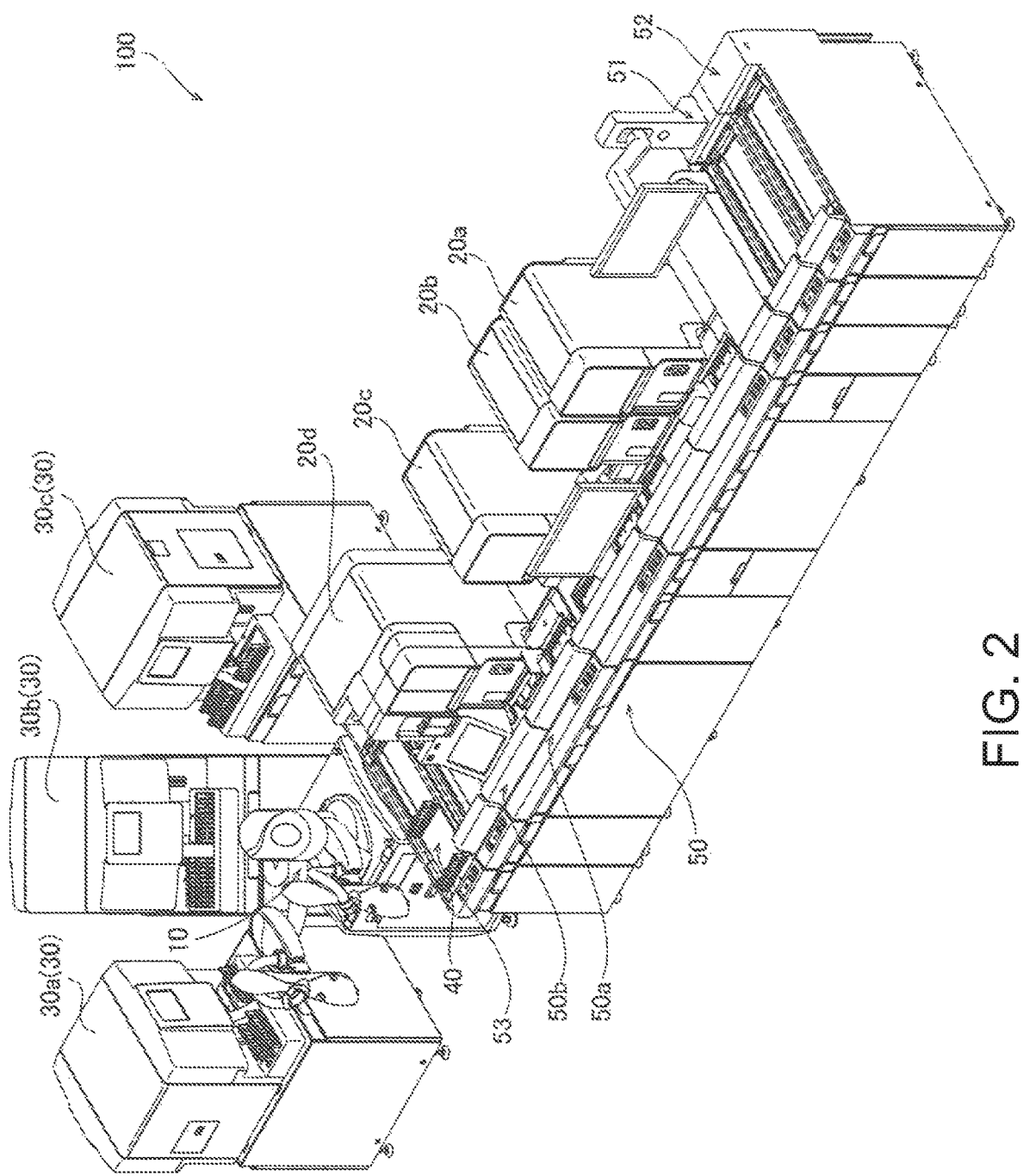
FIG. 2 is a perspective diagram illustrating a sample measurement system provided with a transport device according to a first embodiment.
Figure 3:
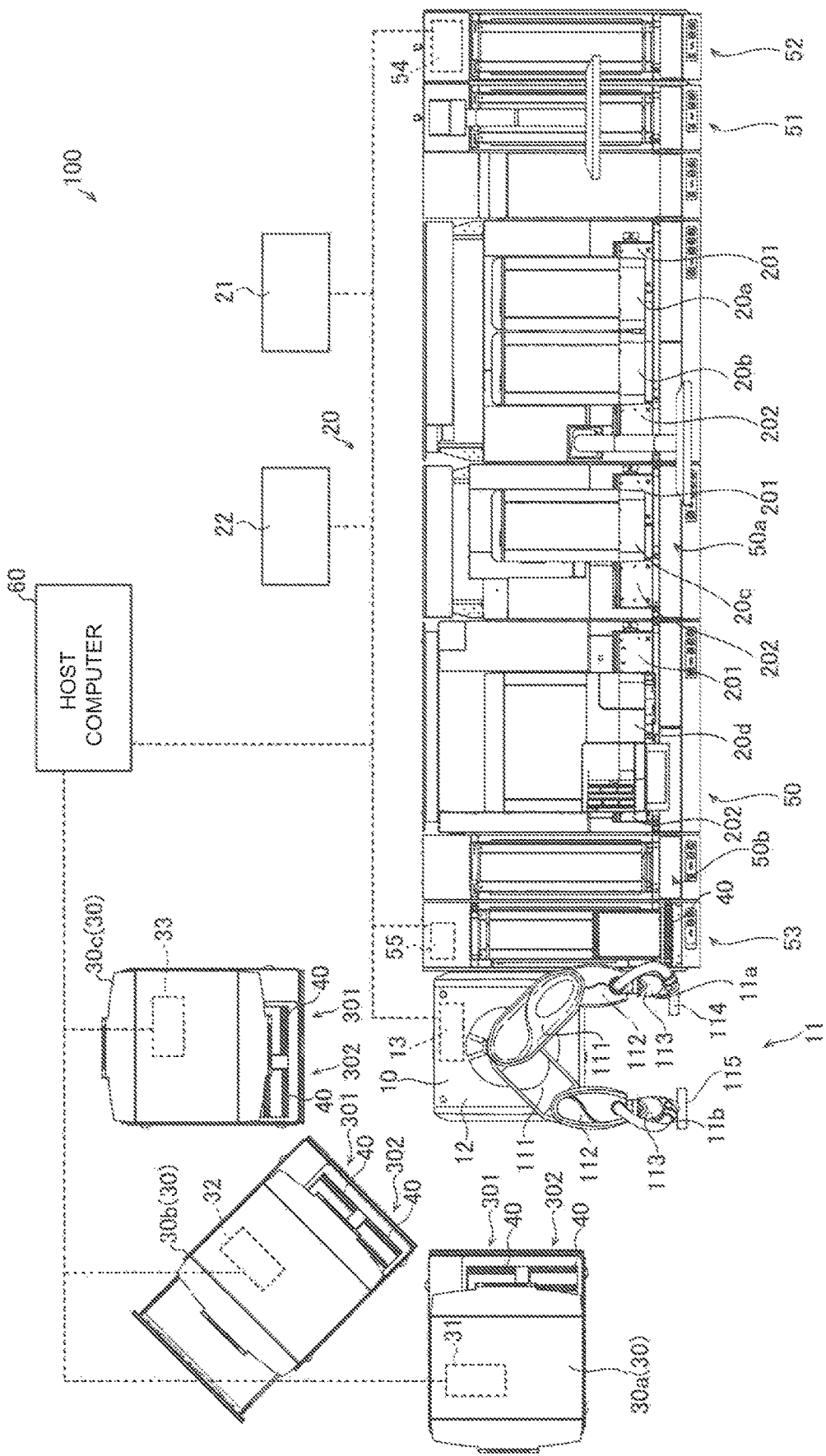
FIG. 3 is a plan diagram illustrating a sample measurement system provided with a transport device according to a first embodiment.

The following describes a specific example of the sample measurement system 100 according to a first embodiment with reference to FIGS. 2 and 3.

As illustrated in FIG. 2, the sample measurement system 100 includes the transport device 10, the first sample measurement device 20, and the other sample measurement devices 30. The first sample measurement device 20 includes sample measurement devices 20a, 20b, 20c, and 20d. The other sample measurement devices 30 include sample measurement devices 30a, 30b, and 30c. The first sample measurement device 20 includes a transport unit 50. The transport unit 50 includes an input unit 51 configured to input the rack 40, a collection unit 52 configured to collect the rack 40, and an accumulation unit 53 configured to accumulate the rack 40. The transport unit 50 also includes a forward transfer line 50a and a backward transfer line 50b. The forward transfer line 50a and the backward transfer line 50b each include a transport conveyer.

As illustrated in FIG. 3, the sample measurement system 100 includes a host computer 60. The sample measurement devices 20a and 20b of the first sample measurement device 20 is connected with a controller 21. The sample measurement device 20c of the first sample measurement device 20 is connected with a controller 22. The sample measurement device 30a includes a controller 31. The sample measurement device 30b includes a controller 32. The sample measurement device 30c includes a controller 33. The transport unit 50 includes a controller 54. The accumulation unit 53 includes a controller 55. The controllers 13, 21, 22, 31, 32, 33, 54, and 55 are connected with the host computer 60 to perform communication therebetween.

The sample measurement devices 20a, 20b, 20c, and 20d of the first sample measurement device 20 are each provided with a supply unit 201 to which to supply the container 41 or the rack 40. The sample measurement devices 20a, 20b, 20c, and 20d of the first sample measurement device 20 are each also provided with an ejection unit 202 for ejecting the container 41 or the rack 40.

The other sample measurement devices 30 are each provided with a supply unit 301 through which the container 41 or the rack 40 is supplied. The other sample measurement devices 30 are each also provided with an ejection unit 302 through which the container 41 or the rack 40 is ejected.

Each robotic arm 11 is operated by, for example, drive of an electric motor. The robotic arm 11 includes an encoder or the like to control the amount of drive of the electric motor. The rated output of the robotic arm 11 is equal to or smaller than a predetermined power. Specifically, the rated output of the robotic arm 11 is equal to or smaller than an output that allows movement in a region in which an operator exists. For example, the rated output of the robotic arm 11 is equal to or smaller than 80 W. Accordingly, the output of the robotic arm 11 can be reduced so that the operator can enter the operation region of the robotic arm 11 when a safety fence and a monitoring device are not provided. In addition, energy saving can be achieved.

The first robotic arm 11a includes a first link member 111, a second link member 112, and a vertical drive unit 113. The first robotic arm 11a is provided with a first hand 114 capable of holding the rack 40. The second robotic arm 11b includes the first link member 111, the second link member 112, and the vertical drive unit 113. The second robotic arm 11b is provided with a second hand 115 capable of holding the rack 40. The first link member 111 is rotatable about a rotational axis line in the vertical direction. The second link member 112 is connected with the first link member 111 in a manner rotatable about a rotational axis line in the vertical direction.

The first hand 114 of the first robotic arm 11a can be moved in the horizontal direction by rotating the first link member 111 and the second link member 112. Specifically, the first hand 114 of the first robotic arm 11a can be translated in the horizontal direction and rotated in the horizontal direction by the first link member 111 and the second link member 112. Accordingly, the rack 40 held by the first hand 114 can be moved in the horizontal direction.

The first hand 114 of the first robotic arm 11a can be moved in the vertical direction by driving the vertical drive unit 113. Accordingly, the rack 40 held by the first hand 114 can be moved in the vertical direction.

The second hand 115 of the second robotic arm 11b can be moved in the horizontal direction by rotating the first link member 111 and the second link member 112. Specifically, the second hand 115 of the second robotic arm 11b can be translated in the horizontal direction and rotated in the horizontal direction by the first link member 111 and the second link member 112. Accordingly, the rack 40 held by the second hand 115 can be moved in the horizontal direction.

The second hand 115 of the second robotic arm 11b can be moved in the vertical direction by driving the vertical drive unit 113. Accordingly, the rack 40 held by the second hand 115 can be moved in the vertical direction.

The robotic arm 11 can hand over the rack 40 between the first robotic arm 11a and the second robotic arm 11b. Accordingly, the orientation of the rack 40 can be easily adjusted. The robotic arms 11 can be selectively used in accordance with the state of a position at which the rack 40 is passed over, and thus the rack 40 can be easily passed over by the robotic arm 11 in accordance with the state of the position at which the rack 40 is passed over.

The robotic arms 11 may transport the rack 40 without handing over the rack 40 between the robotic arms 11, more specifically between the first robotic arm 11a and the second robotic arm 11b. For example, only one robotic arm 11 may be provided. In this case, the rack 40 may be held at a transport source, transported, and placed at a transport destination by the single robotic arm 11. When two or more robotic arms 11 are provided, the robotic arms 11 may be operated in parallel. Specifically, the rack 40 may be held at a transport source, transported, and placed at a transport destination by one of the robotic arms 11.

Each robotic arm 11 transport the container 41 or the rack 40 to the other sample measurement devices 30 arranged circumferentially around the base 12 supporting the robotic arm 11. Specifically, the other sample measurement devices 30a to 30c are arranged around the base 12 at angles equally spaced from each other. The robotic arm 11 is capable of transporting the rack 40 housing the container 41 to each of the sample measurement devices 30a to 30c. Accordingly, the distance to the robotic arm 11 can be made equivalent among the other sample measurement devices 30, and thus control of the robotic arm 11 to transport the container 41 or the rack 40 to each of the other sample measurement devices 30 can be performed in the same manner on the other sample measurement devices 30. Accordingly, it is possible to prevent complication of the control of the robotic arm 11.

The other the sample measurement devices 30a to 30c do not necessarily need to be circumferentially arranged. For example, the other the sample measurement devices 30a to 30c may be arranged straight. Thus, the other the sample measurement devices 30a to 30c do not need to be circumferentially arranged as long as the container 41 or the rack 40 can be transported to the other the sample measurement devices 30a to 30c by the robotic arms 11. In this case, the move region of the robotic arm 11 may be restricted to avoid interference with the other the sample measurement devices 30a to 30c. Specifically, the robotic arm 11, while being folded, may access to other sample measurement devices 30 that are at a close or adjacent position. The robotic arm 11, while being extended, may access to sample measurement devices 30 that are at a far position.

The robotic arms 11 transport the container 41 or the rack 40 to the other sample measurement devices 30 in each of which the supply unit 301 for supplying the container 41 or the rack 40 is positioned facing the base 12. Accordingly, the other sample measurement devices 30 can be arranged surrounding the base 12 supporting the robotic arms 11, and thus the installation width of the other sample measurement devices 30 in the array direction can be reduced as compared to a case in which the other sample measurement devices 30 are linearly arranged. The robotic arms 11 transport the container 41 or the rack 40 to the other sample measurement devices 30 in each of which the ejection unit 302 for ejecting the container 41 or the rack 40 is arranged facing the base 12.

Each robotic arm 11 stops operating when coming into contact with an object other than a transported object in operation. For example, the robotic arm 11 may detect drive current, and detect contact of an object when the drive current exceeds a predetermined threshold. Alternatively, contact of the robotic arm 11 with an object may be detected by a camera or the like configured to monitor operation of the robotic arm 11. Alternatively, contact of the robotic arm 11 with an object may be detected by a sensor or the like. Accordingly, for example, it is possible to prevent large impact on the operator when the robotic arm 11 contacts the operator. In addition, it is possible to prevent an excessive load on the robotic arm 11.

Each robotic arm 11 can be retracted to a position with no interference with the operator. Accordingly, it is possible to prevent interference of the robotic arm 11 with an operation by the operator, and thus prevent decrease of the efficiency of operation by the operator.

The operation range of the robotic arm 11 includes a space in which the operator operates at least one of the other sample measurement devices 30. In other words, the operation range of the robotic arm 11 partially overlaps with the space for operation by the operator. Accordingly, the operator can perform an operation on the first sample measurement device 20 or the other sample measurement devices 30 while the robotic arm 11 is used, which leads to improved convenience and versatility of the operation.

The container 41 or the rack 40 can be taken out from the accumulation unit 53 by the operator or the robotic arms 11. The container 41 or the rack 40 can be transferred to the supply units 301 of the other sample measurement devices 30 by the operator or the robotic arms 11. Accordingly, the container 41 or the rack 40 can be taken out by the robotic arms 11 from the accumulation unit 53 from which the container 41 or the rack 40 is taken out by the operator, and the container 41 or the rack 40 can be passed over by the robotic arms 11 to the supply unit 301 to which the container 41 or the rack 40 is passed over by the operator. Therefore, it is unnecessary to redundantly provide an ejection unit and a supply unit dedicated to the robotic arms 11. Accordingly, a simplified device configuration can be achieved.

The base 12 supports each robotic arm 11. Specifically, the base 12 supports the robotic arm 11 from below. The base 12 is provided independently from the first sample measurement device 20 and the other sample measurement devices 30. In addition, the base 12 is provided independently from an installation surface on which the first sample measurement device 20 and the other sample measurement devices 30 are installed. Accordingly, the base 12 is movable relative to the installation surface.

The base 12 is installed in a region into which the operator of the first sample measurement device 20 and the other sample measurement devices 30 can enter. Accordingly, an operation can be performed on the first sample measurement device 20 or the other sample measurement devices 30 by the robotic arms 11 instead of the operator, which leads to improved versatility.

The controller 13 controls the operation of each robotic arm 11. The controller 13 includes, for example, a central processing unit (CPU) and a memory. The controller 13 is connected with the robotic arm 11 in a wired or wireless manner. Thus, the controller 13 transmits a signal for controlling the robotic arm 11 to the robotic arm 11 through wired communication or wireless communication. Accordingly, the robotic arm 11 can be operated under control of the controller 13 to easily transport the container 41 or the rack 40.

The controller 13 is housed in, for example, the base 12. Accordingly, the installation area can be reduced as compared to a case in which the controller 13 is provided separately from the base 12. In addition, the distance between the controller 13 and the robotic arm 11 can be reduced. As a result, when the controller 13 and the robotic arm 11 are connected with each other in a wired manner, a connection line can be shortened, which leads to a simplified device configuration. When the controller 13 and the robotic arm 11 are connected with each other in a wireless manner, communication can be stabilized. The controller 13 may be provided outside the base 12.

The controller 13 controls the operation of the robotic arm 11 based on position information of a transport source and a transport destination of the container 41 or the rack 40. Accordingly, the robotic arm 11 can be operated through position adjustment by the controller 13, and thus the container 41 or the rack 40 can be accurately transported without accurately positioning and installing the base 12 supporting the robotic arm 11 relative to the first sample measurement device 20 and the other sample measurement devices 30.

The first sample measurement device 20 is, for example, a device configured to measure blood, a device configured to test immunity, a device configured to test urine, or a device configured to test bacteria. The first sample measurement device 20 is, for example, a blood cell measurement device. The other sample measurement devices 30 are positioned on a side opposite to the first sample measurement device 20 with the transport device 10 interposed therebetween. The other sample measurement devices 30 are each, for example, a device configured to measure a sample when needed in addition to measurement by the first sample measurement device 20. The other sample measurement devices 30 are, for example, bacteria test devices. The other sample measurement devices 30 are, for example, devices configured to measure an immunity item. In this manner, the first sample measurement device 20 and each of the other sample measurement devices 30 perform different measurements.

The controller 21 controls the operation of the sample measurement devices 20a and 20b. The controller 21 includes, for example, a CPU and a memory. The controller 21 achieved by, for example, a computer provided outside the sample measurement devices 20a and 20b. The controller 21 may be built in the sample measurement devices 20a and 20b. The controller 21 performs control to measure a sample in the container 41 based on order information at the host computer 60. Specifically, the controller 21 controls the sample measurement devices 20a and 20b to perform measurement on a sample for which measurement by the sample measurement devices 20a and 20b is ordered.

The controller 22 controls the operation of the sample measurement device 20c. The controller 22 includes, for example, a CPU and a memory. The controller 22 is achieved by, for example, a computer provided outside the sample measurement device 20c. The controller 22 may be built in the sample measurement device 20c. The controller 22 performs control to measure a sample in the container 41 based on order information at the host computer 60. Specifically, the controller 22 controls the sample measurement device 20c to perform measurement on a sample for which measurement by the sample measurement device 20c is ordered.

The controller 31 controls the operation of the sample measurement device 30a. The controller 31 includes, for example, a CPU and a memory. The controller 31 is built-in the sample measurement device 30a. The controller 31 performs control to measure a sample in the container 41 based on order information at the host computer 60. Specifically, the controller 31 controls the sample measurement device 30a to perform measurement on a sample for which measurement by the sample measurement device 30a is ordered.

The controller 32 controls the operation of the sample measurement device 30b. The controller 32 includes, for example, a CPU and a memory. The controller 32 is built-in the sample measurement device 30b. The controller 32 performs control to measure a sample in the container 41 based on order information at the host computer 60. Specifically, the controller 32 controls the sample measurement device 30b to perform measurement on a sample for which measurement by the sample measurement device 30b is ordered.

The controller 33 controls the operation of the sample measurement device 30c. The controller 33 includes, for example, a CPU and a memory. The controller 33 is built-in the sample measurement device 30c. The controller 33 performs control to measure a sample in the container 41 based on order information at the host computer 60. Specifically, the controller 33 controls the sample measurement device 30c to perform measurement on a sample for which measurement by the sample measurement device 30c is ordered.

The controller 13 of the transport device 10 receives signals from the other sample measurement devices 30, and controls the operation of the robotic arms 11 based on the received signals. Accordingly, the container 41 or the rack 40 can be transported by the robotic arms 11 in accordance with a request for conveyance of the container 41 or the rack 40 out of or into each of the other sample measurement devices 30.

The controller 13 of the transport device 10 may receive a signal from the first sample measurement device 20 and control the operation of the robotic arms 11 based on the received signal. Accordingly, the rack 40 can be transported by the robotic arms 11 in accordance with a request for conveyance of the container 41 or the rack 40 out of the first sample measurement device 20.

For example, when the rack 40 is to be conveyed out of the first sample measurement device 20, the controller 13 controls the operation of the robotic arms 11 based on "ON" and "OFF" of a "Ready" signal from the controller 55 of the accumulation unit 53. Specifically, when having received "ON" of a "Ready" signal from the accumulation unit 53, the controller 13 transmits "ON" of a Move signal to the accumulation unit 53. Then, transport of the rack 40 is stopped on the accumulation unit 53 side. The controller 13 operates the robotic arms 11 based on "OFF" of a "Ready" signal indicating the stopping of transport of the rack 40 from the accumulation unit 53, and conveys the rack 40 out of the accumulation unit 53. Then, after the transport of the rack 40, the controller 13 transmits "OFF" of a Move signal to the accumulation unit 53. Accordingly, the accumulation unit 53 can resume transport of the rack 40.

When the rack 40 is to be conveyed into one of the other sample measurement devices 30, the controller 13 controls the operation of the robotic arms 11 based on "ON" and "OFF" of "Ready" signals from the controllers 31, 32, and 33 of the other sample measurement device 30. Specifically, when having received "ON" of a "Ready" signal from the other sample measurement device 30, the controller 13 transmits "ON" of a Move signal to the other sample measurement device 30. Then, transport of the rack 40 is stopped on the other sample measurement device 30 side. The controller 13 operates the robotic arms 11 based on "OFF" of a "Ready" signal indicating the stopping of transport of the rack 40 form the other sample measurement device 30, and conveys the rack 40 into the other sample measurement device 30. Then, after the transport of the rack 40, the controller 13 transmits "OFF" of a Move signal to the other sample measurement device 30. Accordingly, the transport of the rack 40 can be resumed on the other sample measurement device 30 side. The same signal communication is performed to control the operation of the robotic arms 11 when the rack 40 is conveyed out of the other sample measurement device 30.

The controller 13 may receive a signal from the controller 54 of the transport unit 50 as an external control system, and control the operation of the robotic arms 11 based on the signal received from the controller 54. Accordingly, when provided as an independent device, the transport device 10 can be cooperated with the first sample measurement device 20 and the other sample measurement devices 30 through the signal from the external control system.

The controller 13 may control the operation of the robotic arms 11 to transport the container 41 or the rack 40 to one of the other sample measurement devices 30 based on transport destination information included in the signal received from the controller 54 of the transport unit 50 as an external control system. Accordingly, it is possible to easily determine a transport destination based on the transport destination information and transport the container 41 or the rack 40.

The controller 13 may control the operation of the robotic arms 11 irrespective of the existence of signals from the first sample measurement device 20 and the other sample measurement devices 30. Accordingly, the robotic arms 11 can be controlled independently from the first sample measurement device 20 and the other sample measurement devices 30, thereby preventing complication of the control.

The controller 13 determines one of the other sample measurement devices 30 to which the container 41 or the rack 40 is to be transported, based on at least one of the number of times of transport to each of the other sample measurement devices 30 and a priority level of each of the other sample measurement devices 30. Accordingly, it is possible to prevent occurrence of use frequency imbalance among the other sample measurement devices 30.

Specifically, the controller 13 determines one other sample measurement device 30 with the smallest number of times of transport as the other sample measurement device 30 to which the container 41 or the rack 40 is to be transported. In other words, the controller 13 determines, as a transport destination this time, the other sample measurement device 30 having the least number of the times that the other sample measurement device 30 has been transport destinations before. In other words, the controller 13 determines, as a transport destination, the other sample measurement device 30 that has been used the least before. The controller 13 determines the other sample measurement device 30 to which the container 41 or the rack 40 is to be transported based on the priority level, in a case in which two or more other sample measurement devices 30 have the same smallest number of times of transport. Accordingly, it is possible to equally use the other sample measurement devices 30, and thus it is possible to effectively prevent occurrence of use frequency imbalance among the other sample measurement devices 30.

When the container 41 or the rack 40 is transported to one of the other sample measurement devices 30, the controller 13 performs control to lower the priority level of the one of the other sample measurement devices 30 to which the container 41 or the rack 40 is transported. Accordingly, it is possible to effectively prevent occurrence of use frequency imbalance among the other sample measurement devices 30.

The transport unit 50 transports the container 41 or the rack 40. Specifically, the transport unit 50 transports the rack 40 housing the container 41. The transport unit 50 extends in a direction in which the sample measurement devices 20a, 20b, 20c, and 20d are arranged. The transport unit 50 transports the container 41 or the rack 40 among the sample measurement devices 20a, 20b, 20c, and 20d, the input unit 51, the collection unit 52, and the accumulation unit 53. Specifically, the transport unit 50 transports the rack 40 from the input unit 51 side toward the accumulation unit 53 side through the forward transfer line 50a. The transport unit 50 also transports the rack 40 from the accumulation unit 53 side toward the collection unit 52 side through the backward transfer line 50b. The transport unit 50 transports the rack 40 in the horizontal direction.

The transport unit 50 supplies the rack 40 to the supply unit 201 provided in the first sample measurement device 20. The transport unit 50 receives the rack 40 from the ejection unit 202 provided in the first sample measurement device 20.

The input unit 51 houses the container 41 or the rack 40 input to the first sample measurement device 20. Specifically, the input unit 51 houses the rack 40 housing the container 41. The input unit 51 can house racks 40. The collection unit 52 houses the container 41 or the rack 40 conveyed out of the first sample measurement device 20. Specifically, the collection unit 52 houses the rack 40 housing the container 41. The collection unit 52 can house racks 40. The accumulation unit 53 houses the container 41 or the rack 40 input to the other sample measurement devices 30. In other words, the accumulation unit 53 houses the rack 40 including the container 41 housing a sample needed to be measured by the other sample measurement devices 30. Accordingly, the accumulation unit 53 houses the container 41 or the rack 40 conveyed out of the first sample measurement device 20. In addition, the accumulation unit 53 houses the rack 40 housing the container 41. The accumulation unit 53 can house racks 40.

The controller 54 controls the forward transfer line 50a that transports the container 41 or the rack 40 to the first sample measurement device 20. The controller 55 controls transport of the rack 40 by the accumulation unit 53.

The host computer 60 controls the entire sample measurement system 100. Specifically, the host computer 60 controls the entire sample measurement system 100 through communication with each controller. The host computer 60 is, for example, a personal computer. The host computer 60 manages the measurement order of each of samples. Specifically, the host computer 60 manages the kind of measurement necessary for each sample.

(Drive of Robotic Arm)

Figure 4:
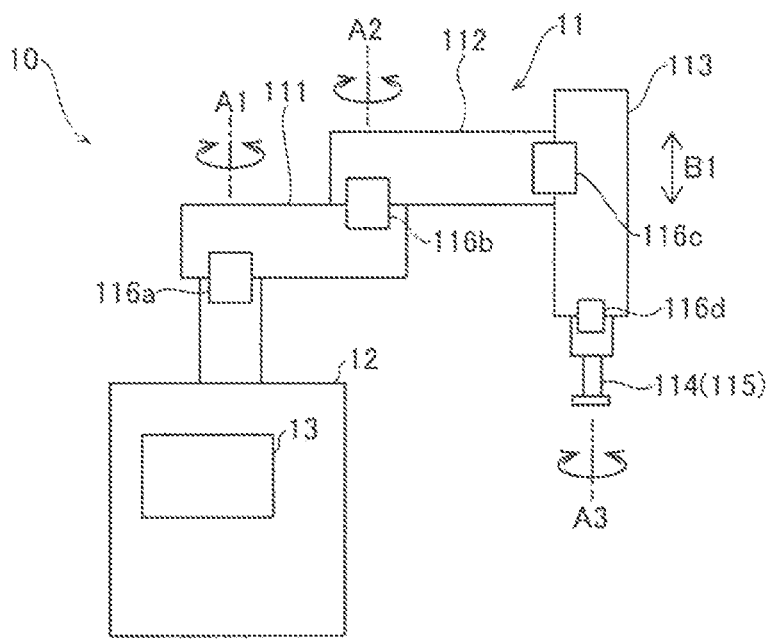
FIG. 4 is a block diagram illustrating drive of a robotic arm.

The following describes drive of each robotic arm 11 with reference to FIG. 4.

As illustrated in FIG. 4, the robotic arm 11 is provided with drive units 116a, 116b, 116c, and 116d. The drive units 116a to 116d each include a motor and a position detector such as an encoder. The drive units 116a to 116d are controlled in cooperation by the controller 13. Specifically, the controller 13 controls drive of the drive units 116a to 116d based on position information of a transport source and a transport destination to transport the container 41 or the rack 40.

The drive unit 116a rotates the first link member 111 about a rotational axis line A1 relative to the base 12. The drive unit 116b rotates the second link member 112 about a rotational axis line A2 relative to the first link member 111. The drive unit 116c moves the vertical drive unit 113 in the vertical direction (B1) relative to the second link member 112. The drive unit 116d rotates the first hand 114 (second hand 115) about a rotational axis line A3 relative to the vertical drive unit 113. Accordingly, a hand provided at a leading end of the robotic arm 11 can be moved a desired three-dimensional position.

A home position as an initial position is set to the robotic arm 11. The home positions of the first robotic arm 11a and the second robotic arm 11b are set avoiding interference therebetween. Each robotic arm 11 is driven with reference to the home position.

(Transport Device Fixation Method)

Figures 5A, 5B:
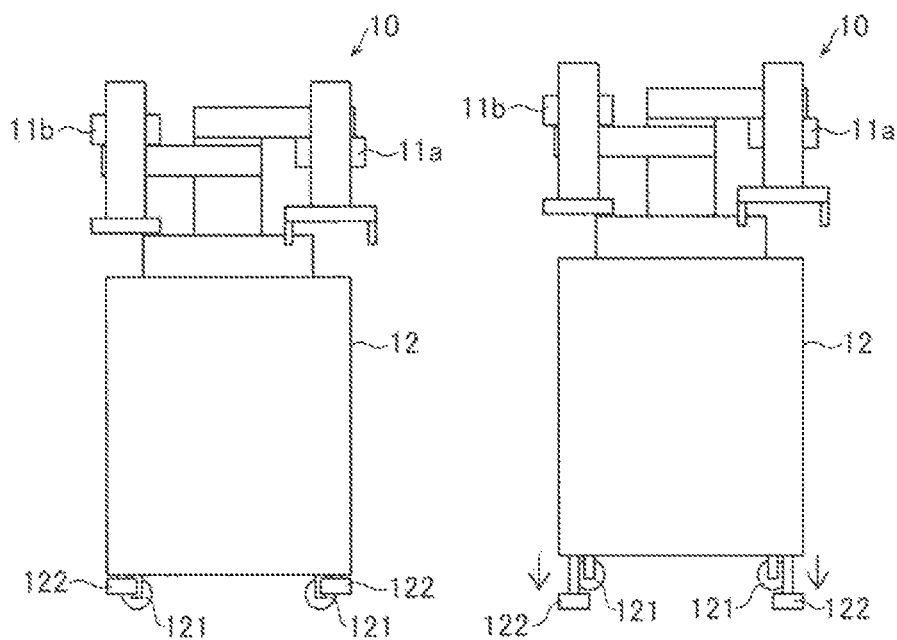
FIG. 5A and FIG. 5B are diagrams each illustrating of an exemplary transport device fixation method.

The following describes a method of fixing the transport device 10 with reference to FIGS. 5A and 5B.

As in an example illustrated in FIGS. 5A and 5B, the base 12 of the transport device 10 is provided with casters 121 that move the base 12 relative to the installation surface, and expandable and contractable fixation legs 122. As illustrated in FIG. 5A, when the fixation legs 122 are contracted in the base 12, the casters 121 contact the installation surface so that the transport device 10 can be transported. As illustrated in FIG. 5B, when the fixation legs 122 are expanded, the casters 121 float above the installation surface so that the transport device 10 can be fixed and prevented from moving. In other words, when the fixation legs 122 are expanded and touch or contact the installation surface, the casters 121 does not touch or contact the installation surface. In other words, the fixation legs 122 can be expanded so as to be vertically longer than the casters 121 and can be contracted so as to be vertically shorter than the casters 121. For example, the casters 121 are provided at four corners, respectively. The fixation legs 122 are provided at the four corners, respectively.

(First Hand)

Figure 6:
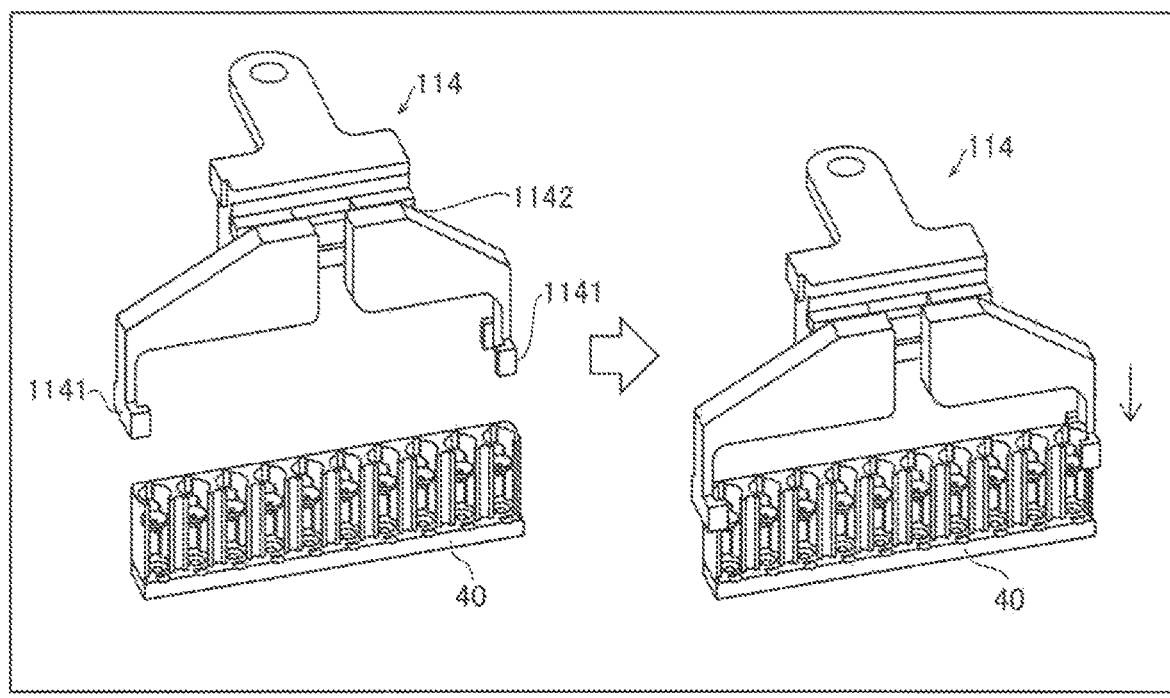
FIG. 6 is a diagram illustrating a first hand.

The following describes the first hand 114 provided in the first robotic arm 11a with reference to FIG. 6.

The first hand 114 is capable of grasping the rack 40. The first hand 114 is attached to the first robotic arm 11a in a replaceable manner. The first hand 114 includes a pair of grasping units 1141 and an air cylinder 1142. The pair of grasping units 1141 can be moved in a direction approaching to each other and a direction separating from each other by the air cylinder 1142. Accordingly, the rack 40 can be grasped and released by the grasping units 1141. The grasping units 1141 may be driven by a motor. Alternatively, the grasping units 1141 may be driven by fluid pressure such as hydraulic pressure or water pressure. The first hand 114 is capable of grasping the rack 40 from above. The first hand 114 grasps the rack 40 from both sides in the longitudinal direction thereof. Accordingly, the rack 40 can be grasped when there is no gap in the transverse direction of the rack 40.

(Second Hand)

Figure 7:
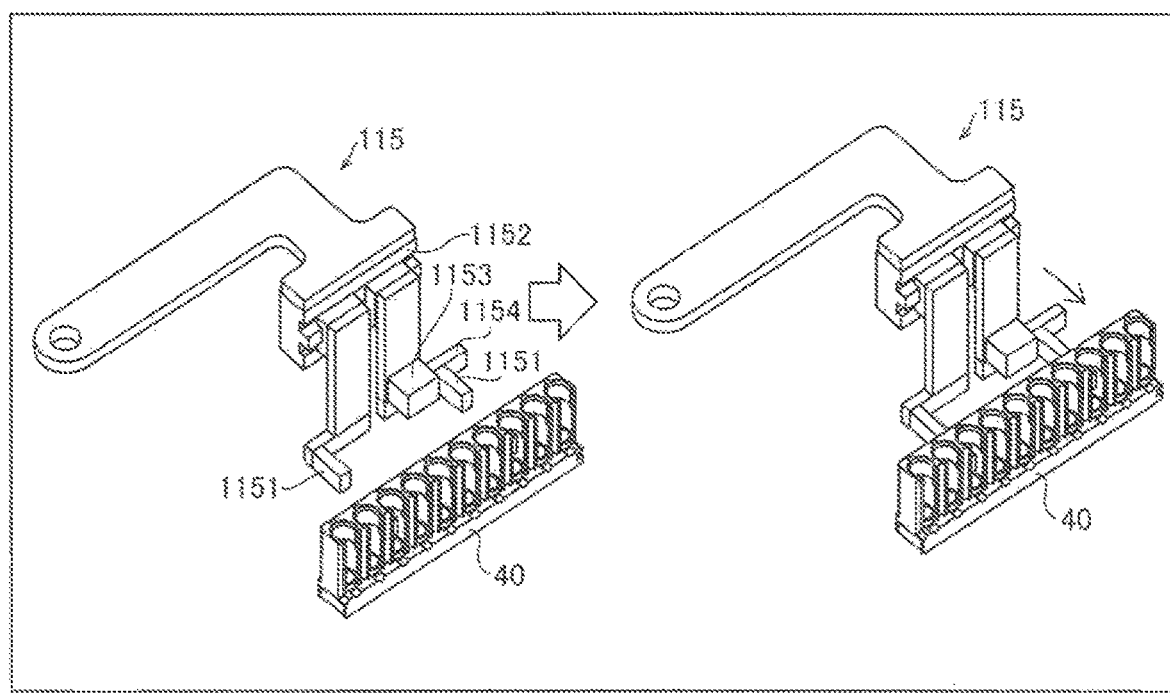
FIG. 7 is a diagram illustrating a second hand.

The following describes the second hand 115 provided in the second robotic arm 11b with reference to FIG. 7.

The second hand 115 is capable of grasping the rack 40. The second hand 115 is attached to the second robotic arm 11b in a replaceable manner. The second hand 115 includes a pair of grasping units 1151, an air cylinder 1152, a sensor 1153, and a guide 1154. The pair of grasping units 1151 can be moved in a direction approaching to each other and a direction separating from each other by the air cylinder 1152. Accordingly, the rack 40 can be grasped or released by the grasping units 1151. The grasping units 1151 may be driven by a motor. Alternatively, the grasping units 1151 may be driven by fluid pressure such as hydraulic pressure or water pressure. The second hand 115 is capable of grasping the rack 40 from side. The second hand 115 grasps the rack 40 from both sides in the longitudinal direction thereof. For example, the second hand 115 is capable of grasping places between holders holding the containers 41 in the longitudinal direction of the rack 40. The sensor 1153 is capable of sensing the rack 40. The sensor 1153 is, for example, a non-contact sensor. The sensor 1153 is, for example, an optical or ultrasonic-wave sensor. The sensor 1153 may be a contact sensor. Accordingly, the rack 40 can be reliably grasped by the second hand 115. The guide 1154 can adjust the posture of the rack 40 by pressing.

(Rack Detection Method)

Figure 8:
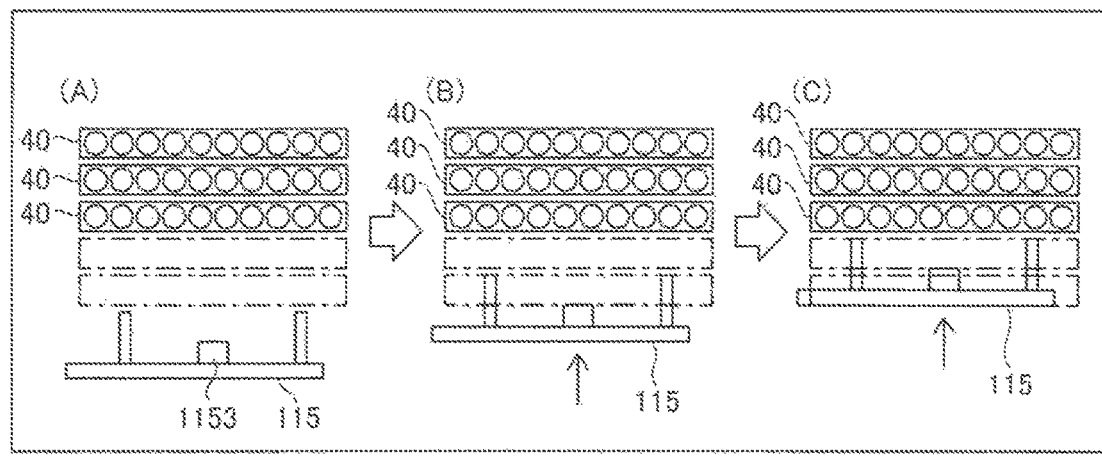
FIG. 8 is a diagram illustrating an exemplary rack detection method.

The following describes a method of detecting the rack 40 with reference to FIG. 8.

Racks 40 can be placed at a take-out position. Accordingly, each rack 40 at the take-out position is not placed at a constant position. For example, each rack 40 is sequentially pushed to the take-out position after measurement by the other sample measurement devices 30. Thus, when there are a large number of racks 40, a rack 40 on the near side at the take-out position is pushed further on the near side.

When taking out the rack 40 from the take-out position, each robotic arm 11 moves the second hand 115 for grasping the rack 40 at stages in the horizontal direction in which racks 40 are arranged, and detects the rack 40. Specifically, as in an example illustrated in (A) to (C) of FIG. 8, the robotic arm 11 moves the second hand 115 sequentially stepwise by the width of the rack 40 from the nearest position in the back-surface direction. In this case, the rack 40 is detected by the sensor 1153. The second hand 115 is sequentially moved until the rack 40 is detected by the sensor 1153. Then, when the rack 40 is sensed, the second hand 115 holds the rack 40. Accordingly, the rack 40 can be easily held and taken out by the second hand 115 without accurately acquiring the position of the rack 40 at the take-out position. This simplifies the operation of the robotic arms 11 and prevents complication of a computer program for the operation.

The second hand 115 may be moved at stages or may be continuously moved until the rack 40 is detected, and then stopped when the rack 40 is detected.

(Rack Position Adjustment Method)

Figure 9:
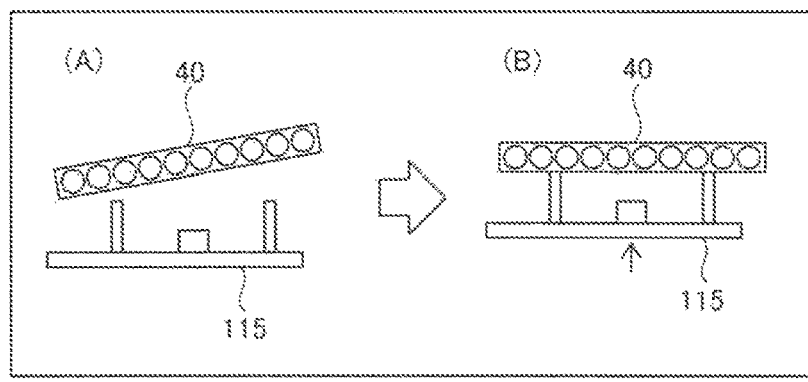
FIG. 9 is a diagram illustrating a first example of rack position adjustment.
Figure 10:
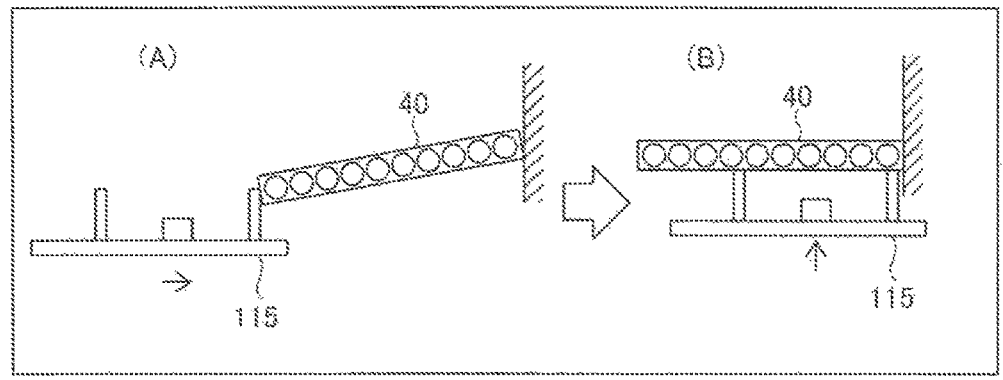
FIG. 10 is a diagram illustrating a second example of rack position adjustment.

The following describes a method of adjusting the position of the rack 40 with reference to FIGS. 9 and 10.

Racks 40 can be placed at the take-out position. For example, each rack 40 is sequentially pushed to the take-out position after measurement by the other sample measurement devices 30. Thus, the rack 40 is placed at a tilt at the take-out position in some cases.

When the rack 40 is taken out by each robotic arm 11, the position of the rack 40 in the horizontal direction may be adjusted. For example, when taking out the rack 40 from the take-out position, the robotic arm 11 may press to move the rack 40 in the horizontal direction and then hold the rack 40. Accordingly, when taken out while the position of the rack 40 is tilted in the horizontal direction, the rack 40 is pressed and moved so that the posture of the rack 40 can be adjusted, and thus the rack 40 can be prevented from being held while being tilted or from not being held.

As in a first example illustrated in FIG. 9, the rack 40 may be pressed in the transverse direction of the rack 40 by the second hand 115 to adjust the position and posture thereof. In addition, as in second example illustrated in FIG. 10, the rack 40 may be pressed in the longitudinal direction of the rack 40 by the second hand 115 to perform positioning in the longitudinal direction, and then may be pressed in the transverse direction of the rack 40 to adjust the position and posture thereof.

Figure 11:
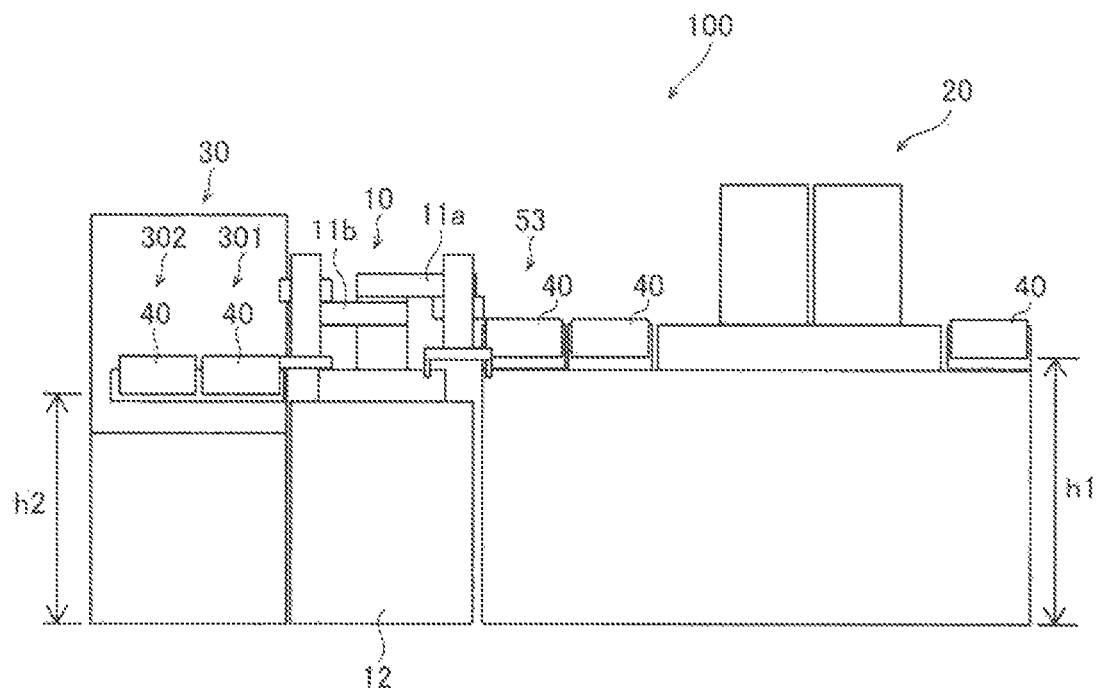
FIG. 11 is a front diagram illustrating a height level of each device of a sample measurement system.

The following describes the height level of each device with reference to FIG. 11.

As illustrated in FIG. 11, the height levels of the devices may be different from each other. For example, the height level of the first sample measurement device 20 at which the rack 40 is transported may be different from the height level of the other sample measurement device 30 at which the rack 40 is transported. When h1 represents the height level of the first sample measurement device 20 at which the rack 40 is transported, the height level of the other sample measurement device 30 at which the rack 40 is transported is h2 smaller than h1. Alternatively, h2 may be larger than h1. Thus, the ejection unit through which the rack 40 is ejected from the first sample measurement device 20, and the supply unit 301 through which the rack 40 is supplied to the other sample measurement device 30 are placed at positions different in the height level from the installation surface. The robotic arm 11 transports the rack 40 from the ejection unit to the supply unit 301, the height of which from the installation surface is different from that of the ejection unit. In other words, the robotic arm 11 is capable of transporting the rack 40 in the vertical direction. Accordingly, when the heights of the ejection unit and the supply unit 301 are different from each other, the rack 40 can be transported without redundantly providing an elevation device. In addition, it is possible to easily combine and use measurement devices at heights different from each other, and thus it is possible to effectively increase the freedom of selection of the measurement devices.

Figure 12:
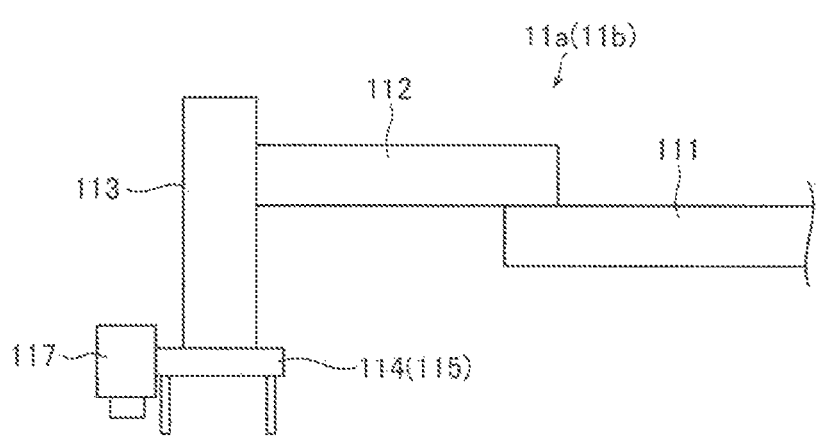
FIG. 12 is a diagram illustrating a robotic arm provided with an image capturing unit.

As illustrated in FIG. 12, the robotic arm 11 may be provided with an image capturing unit 117. In this case, the controller 13 of the transport device 10 may control the operation of the robotic arms 11 based on an image captured by the image capturing unit 117. For example, the controller 13 may check the existence of the rack 40 to be transported based on the captured image. When there is the rack 40 to be transported, the rack 40 may be taken out by the robotic arm 11. The controller 13 may sense the position and posture of the rack 40 to be taken out based on the captured image, and take out the rack 40. The controller 13 may check a position at which the rack 40 is to be placed based on the captured image, and then place the rack 40. The image capturing unit 117 may be provided in the robotic arm 11 and moved by drive of the robotic arm 11. Accordingly, an image capturing angle and an image capturing position can be changed by the robotic arm 11, and thus an image of a desired position can be captured without increasing the visual field of the image capturing unit 117. Alternatively, the image capturing unit 117 may be fixedly provided at a position separated from the robotic arm 11. The image capturing unit 117 includes, for example, an image capturing element, and an optical system including a lens and a mirror that guide light to the image capturing element.

(Table at Host Computer)

The following describes a control table held at the host computer 60 with reference to FIG. 13.

As illustrated in FIG. 13, the host computer 60 stores a sample ID and a measurement order in association with each other to manage the order of measurement of samples. The measurement order may be specified by the operator or may be determined by the host computer 60.

(Table at Controller of Transport Unit)

The following describes a control table held at the controller 54 of the transport unit 50 with reference to FIG. 14.

As illustrated in FIG. 14, the controller 54 of the transport unit 50 stores the rack ID of the rack 40, the sample ID of a sample housed in the container 41, and an additional measurement order in association with one another. The controller 54 acquires the sample ID by reading, through a reading device, an identifier such as a bar code or an IC tag attached to the container 41. The controller 54 acquires the rack ID by reading, through the reading device, an identifier such as a bar code or an IC tag attached to the rack 40. The controller 54 acquires the additional measurement order for each sample ID through query to the host computer 60.

For example, in a case of "a", the additional measurement order is a measurement order at the sample measurement device 20c. For example, blood cell measurement is performed at the sample measurement device 20c. In a case of "b", the additional measurement order is a measurement order at the sample measurement device 20d. For example, smear production is performed at the sample measurement device 20d. In a case of "c", the additional measurement order is a measurement order at the other sample measurement devices 30. For example, bacteria test measurement is performed at the other sample measurement devices 30. For example, CRP measurement is performed.

(Table at Controller of Robotic Arm)

The following describes a control table held at the controller 13 of the robotic arm 11 with reference to FIG. 15.

As illustrated in FIG. 15, to control transport of the rack 40, the controller 13 of the robotic arm 11 stores position information of each position, and the priority level of each of the other sample measurement devices 30 and the number of times of transport thereto. The position information is stored as, for example, position information of a three-dimensional orthogonal coordinate system. For each of the other sample measurement devices 30, a conveyance-in position as the position of the supply unit 301 and a conveyance-out position as the position of the ejection unit 302 are stored. The position information is acquired by the controller 13 through teaching of the robotic arm 11 at installation of the transport device 10. When the other sample measurement devices 30 can receive the rack 40, the number of times of transport and the priority level are used to determine which of the other sample measurement devices 30 the rack 40 is to be transported to. For example, the other sample measurement device 30 with the smallest number of times of transport is selected among the other sample measurement devices 30. However, in a case in which there are two or more other sample measurement devices 30 with the smallest same number of times of transport, the other sample measurement device 30 having the highest priority level is selected among the other sample measurement devices 30. The priority level may be set by the operator in advance. The priority levels may be updated at each transport. The number of times of transport for each of the other sample measurement devices 30 is incremented at each transport to the other sample measurement device 30. The number of times of transport may be reset halfway by an operation by the operator.

The controller 13 controls drive of the drive units 116a to 116d based on position information of a transport source and a transport destination to transport the container 41 or the rack 40. For example, the controller 13 moves the robotic arm 11 positioned at the home position to a position for grasping the container 41 or the rack 40 based on the position information. In this case, the controller 13 moves the robotic arm 11 by driving the drive units 116a to 116d based on the relative positional relation between the home position and the position for grasping the container 41 or the rack 40. The controller 13 moves the robotic arm 11 at the position for grasping the container 41 or the rack 40 to a position for passing over the container 41 or the rack 40 based on the position information. In this case, the controller 13 moves the robotic arm 11 by driving the drive units 116a to 116d based on the relative positional relation between the position for grasping the container 41 or the rack 40 and the position for passing over the container 41 or the rack 40. When the container 41 or the rack 40 is to be passed over from one of the first robotic arm 11a and the second robotic arm 11b to the other, the controller 13 moves each of the first robotic arm 11a and the second robotic arm 11b to the position for passing over the container 41 or the rack 40.

(Transport Processing Performed by Controller of Transport Unit)

Figure 16:
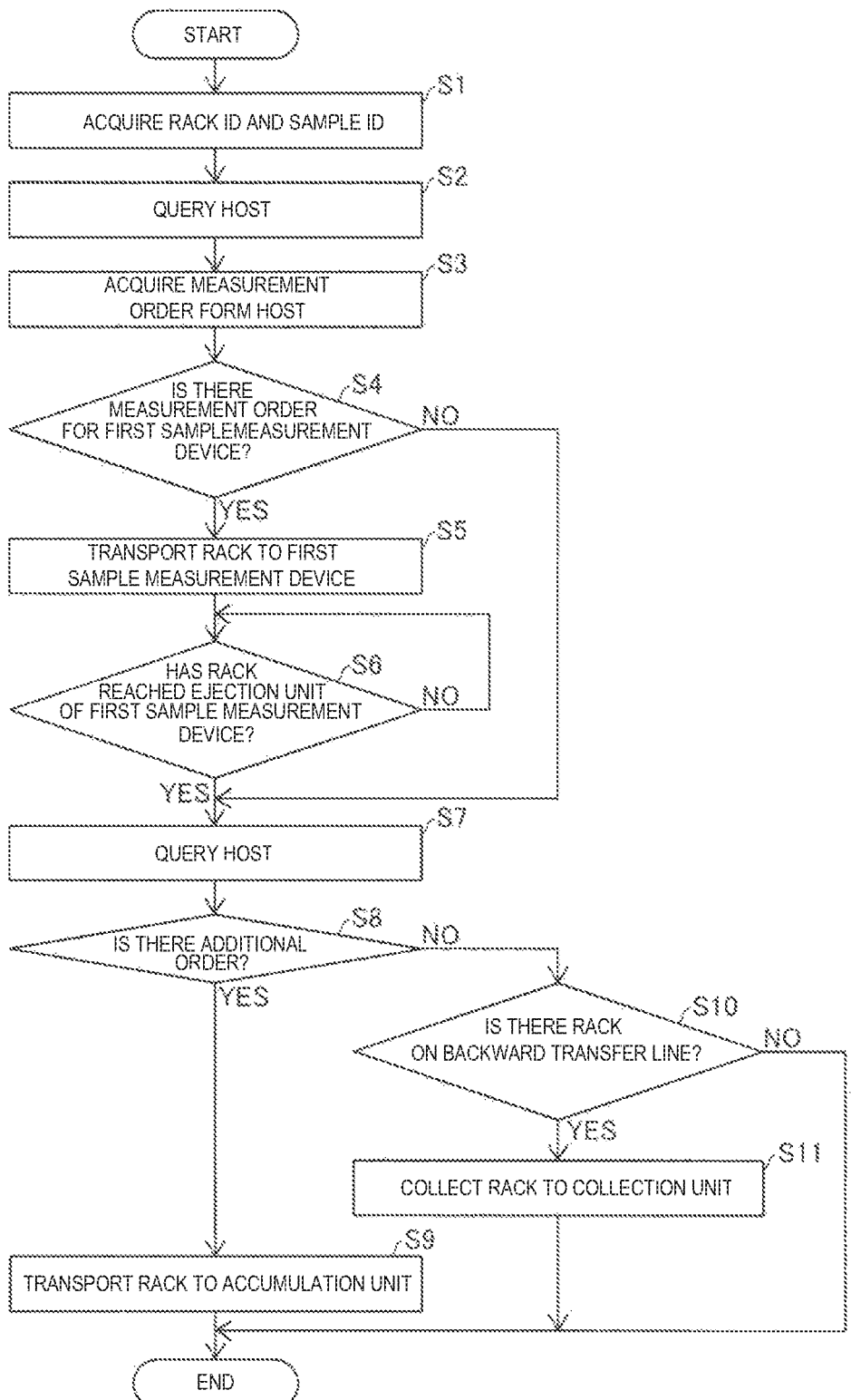
FIG. 16 is a flow diagram illustrating transport processing performed by a controller of a transport unit.

The following describes transport processing performed by the controller 54 of the transport unit 50 with reference to FIG. 16.

At step S1 in FIG. 16, the controller 54 of the transport unit 50 acquires a rack ID and a sample ID. The controller 54 records the acquired rack ID and sample ID in a table. At step S2, the controller 54 queries the host computer 60 for the measurement order of a sample having the acquired sample ID.

At step S3, the controller 54 acquires the measurement order form the host computer 60. At step S4, the controller 54 determines whether there is a measurement order for the first sample measurement device 20 based on the acquired measurement order. The process proceeds to step S5 when there is a measurement order for the sample measurement device, or proceeds to step S7 when there is no measurement order for the sample measurement device.

At step S5, the controller 54 performs control to transport the rack 40 to the first sample measurement device 20. At step S6, the controller 54 determines whether the rack 40 has reached the ejection unit 202 of the first sample measurement device 20. Specifically, the controller 54 determines whether measurement by the first sample measurement device 20 has ended and the rack 40 has been ejected to the ejection unit 202. The controller 54 repeats the determination at step S6 until the rack 40 is ejected.

After the rack 40 has been ejected, the controller 54 queries the host computer 60 for any additional order at step S7. At step S8, the controller 54 determines whether there is an additional order. The process proceeds to step S9 when there is an additional order, or proceeds to step S10 when there is no additional order.

At step S9, the controller 54 performs control to transport the rack 40 to the accumulation unit 53. Thereafter, the transport processing is ended.

At step S10, the controller 54 determines whether there is the rack 40 on the backward transfer line 50b. The process proceeds to step S11 when there is the rack 40 on the backward transfer line 50b, or the transport processing is ended when there is no rack 40 on the backward transfer line 50b. At step S11, the controller 54 controls the backward transfer line 50b to collect the rack 40 to the collection unit 52. Thereafter, the transport processing is ended.

(Rack Conveyance-In Transport Processing Performed by Controller of Robotic Arm)

Figure 17:
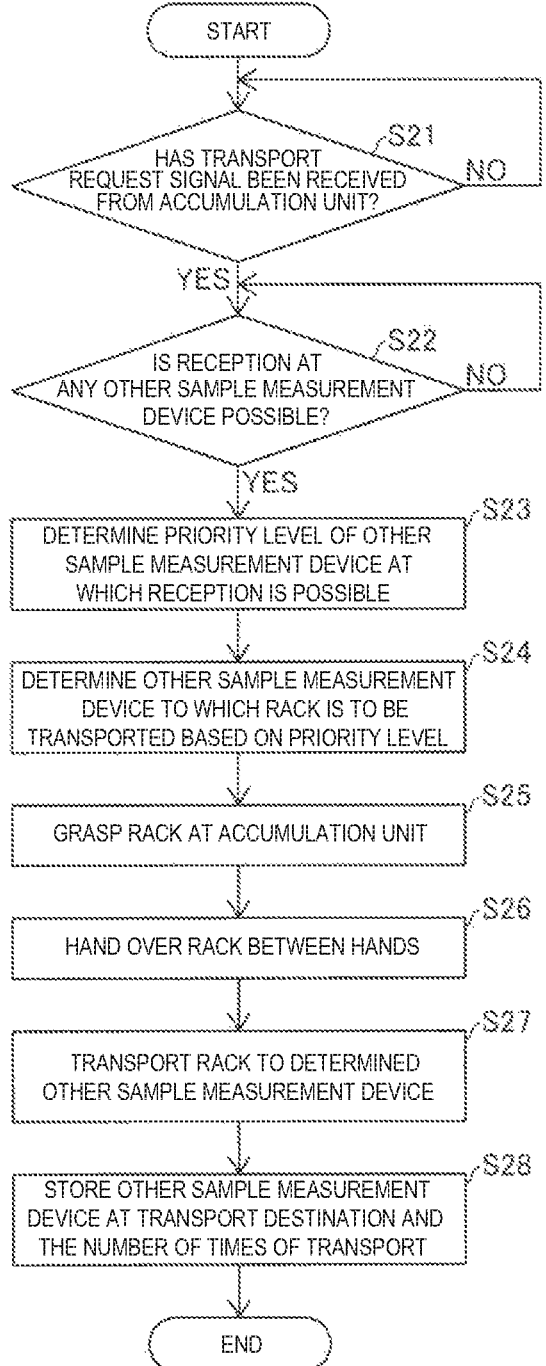
FIG. 17 is a flow diagram illustrating transport processing (conveyance-in) performed by a controller of a robotic arm.

The following describes transport processing performed by the controller 13 of the robotic arm 11 when the rack 40 is conveyed in with reference to FIG. 17.

At step S21 in FIG. 17, the controller 13 of the robotic arm 11 determines whether a transport request signal has been received from the accumulation unit 53. The controller 13 repeats the determination at step S21 until the transport request signal is received. When having received the transport request signal, the controller 13 determines whether reception at any of the other sample measurement devices 30 is possible at step S22. The controller 13 repeats the determination at step S22 until reception at any of the other sample measurement devices 30 becomes possible.

At step S23, the controller 13 determines the priority levels of the other sample measurement devices 30 at which reception is possible. Specifically, the controller 13 determines the other sample measurement device 30 to which the rack 40 is to be transported based on the number of times of transport and the priority level in a table. At step S24, the controller 13 determines the other sample measurement device 30 to which the rack 40 is to be transported based on the priority level.

At step S25, the controller 13 performs control to grasp the rack 40 at the accumulation unit 53. Specifically, the controller 13 controls the first hand 114 of the first robotic arm 11a to grasp the rack 40 at the accumulation unit 53. At step S26, the controller 13 performs control to hand over the rack 40 from the first hand 114 to the second hand 115.

At step S27, the controller 13 performs control to transport the rack 40 to the determined other sample measurement device 30. Specifically, the controller 13 controls the second hand 115 of the second robotic arm 11b to transport the rack 40 to the supply unit 301 of the other sample measurement device 30. At step S28, the other sample measurement device 30 at the transport destination and the number of times of transport thereto are stored. Thereafter, the transport processing is ended.

(Rack Conveyance-Out Transport Processing Performed by Controller of Robotic Arm)

Figure 18:
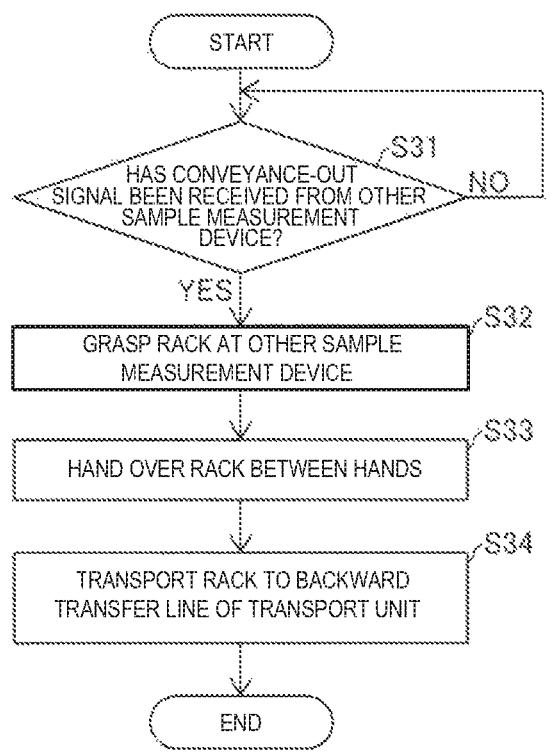
FIG. 18 is a flow diagram illustrating transport processing (conveyance-out) performed by a controller of a robotic arm.

The following describes transport processing performed by the controller 13 of the robotic arm 11 when the rack 40 is conveyed out with reference to FIG. 18.

At step S31 in FIG. 18, the controller 13 of the robotic arm 11 determines whether a conveyance-out signal has been received from any of the other sample measurement devices 30. The controller 13 repeats the determination at step S31 until the conveyance-out signal is received. At step S32, the controller 13 performs control to grasp the rack 40 at the other sample measurement device 30. Specifically, the controller 13 controls the second hand 115 of the second robotic arm 11b to grasp the rack 40 at the ejection unit 302 of the other sample measurement device 30.

At step S33, the controller 13 performs control to hand over the rack 40 from the second hand 115 to the first hand 114. At step S34, the controller 13 performs control to transport the rack 40 to the backward transfer line 50b of the transport unit 50. Specifically, the controller 13 controls the first hand 114 of the first robotic arm 11a to transport the rack 40 to the backward transfer line 50b. Thereafter, the transport processing is ended.

(Processing Performed by Controller of Other Sample Measurement Device)

Figure 19:
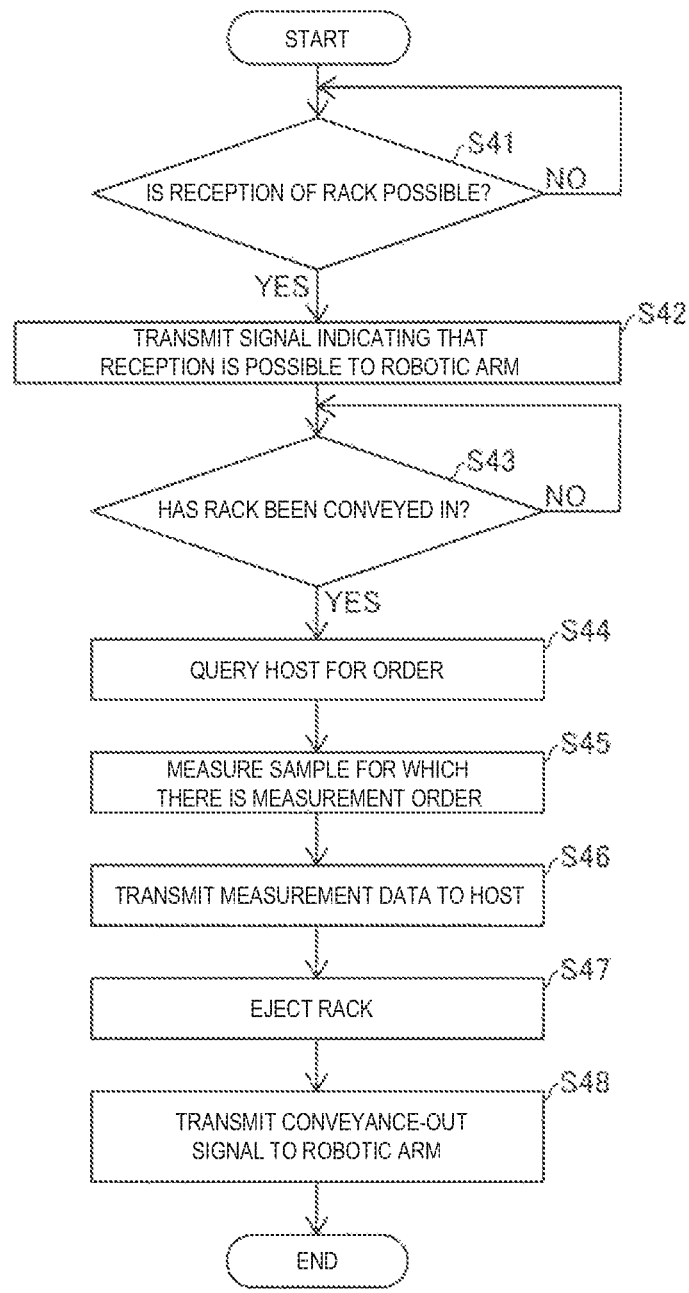
FIG. 19 is a flow diagram illustrating control processing performed by a controller of other sample measurement device.

The following describes processing performed by each of the controllers 31, 32, and 33 of the other sample measurement devices 30 with reference to FIG. 19. The controllers 31, 32, and 33 perform the same control processing, and thus the following description is made on the processing performed by the controller 31.

At step S41 in FIG. 19, the controller 31 of the sample measurement device 30a determines whether reception of the rack 40 is possible. The controller 31 repeats the determination at step S41 until reception of the rack 40 becomes possible. When the reception is possible, the controller 31 transmits, to the robotic arm 11, a signal indicating that the reception is possible at step S42.

At step S43, the controller 31 determines whether the rack 40 has been conveyed in. Specifically, the controller 31 determines whether the rack 40 has been supplied to the supply unit 301 of the sample measurement device 30a. At step S44, the controller 31 queries the host computer 60 for an order. Specifically, the controller 31 queries the host computer 60 for orders for all samples housed in the rack 40.

At step S45, the controller 31 performs control to measure a sample for which there is a measurement order. At step S46, the controller 31 transmits measurement data obtained through the measurement to the host computer 60.

At step S47, the controller 31 performs control to eject the rack 40. Specifically, the controller 31 performs control to eject the rack 40 housing the measured sample from the ejection unit 302. At step S48, the controller 31 transmits a conveyance-out signal to the robotic arm 11. Thereafter, the processing is ended.

Second Embodiment

The following describes the transport device 10 according to a second embodiment with reference to FIGS. 20 to 27. Any component identical to that of the first embodiment described above is denoted by an identical reference sign, and description thereof will be omitted.

Figure 20:
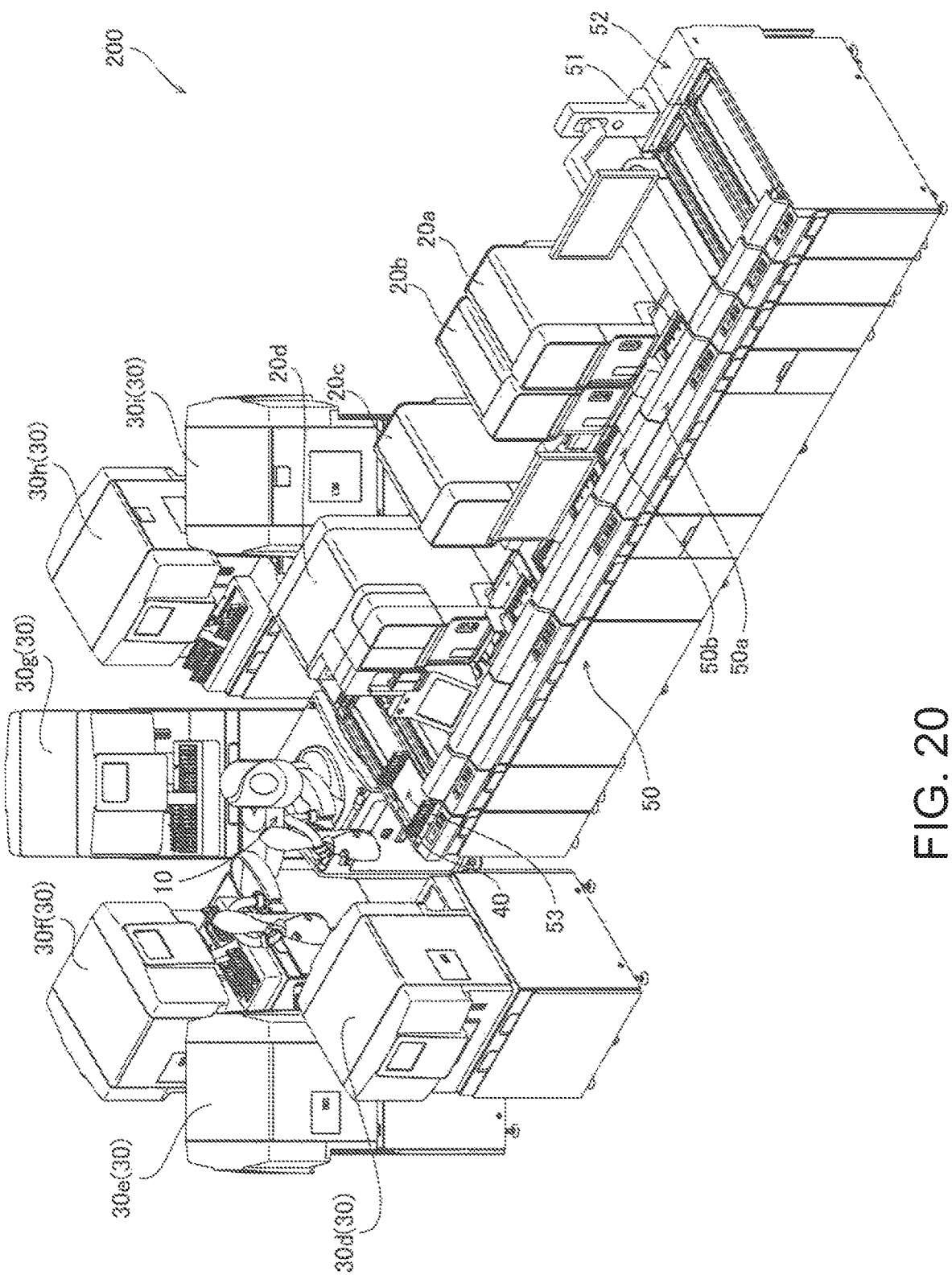
FIG. 20 is a perspective diagram illustrating a sample measurement system provided with a transport device according to a second embodiment.

As illustrated in FIG. 20, a sample measurement system 200 according to a second embodiment includes the transport device 10, the first sample measurement device 20, and the other sample measurement devices 30. The first sample measurement device 20 includes the sample measurement devices 20a, 20b, 20c, and 20d. The other sample measurement devices 30 include sample measurement devices 30d, 30e, 30f, 30g, 30h, and 30i.

Figure 21:
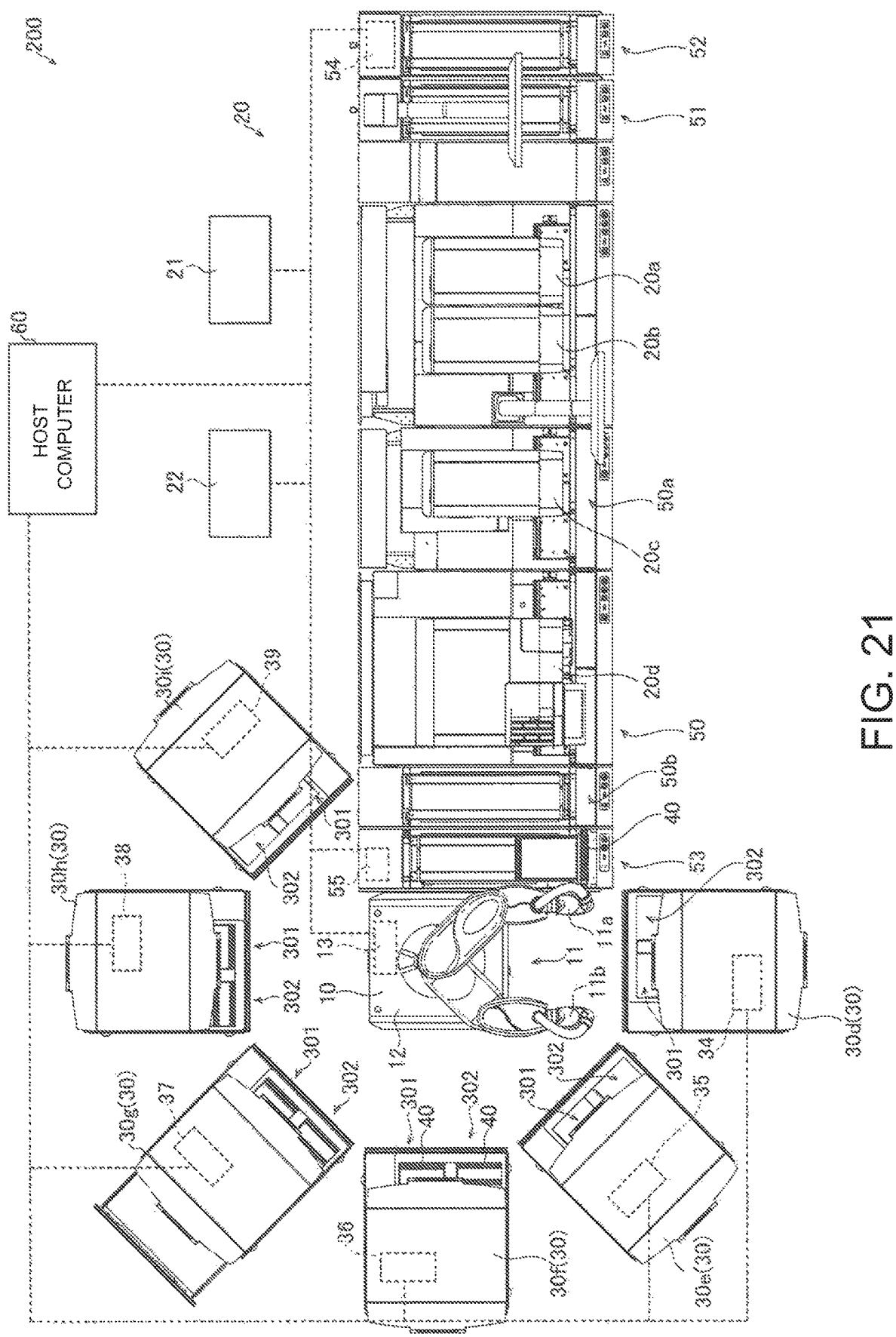
FIG. 21 is a plan diagram illustrating a sample measurement system provided with a transport device according to a second embodiment.

The sample measurement system 200 also includes the host computer 60, as illustrated in FIG. 21. The sample measurement device 30d includes a controller 34. The sample measurement device 30e includes a controller 35. The sample measurement device 30f includes a controller 36. The sample measurement device 30g includes a controller 37. The sample measurement device 30h includes a controller 38. The sample measurement device 30i includes a controller 39. The controllers 13, 21, 22, 34, 35, 36, 37, 38, 39, 54, and 55 are connected with the host computer 60 to perform communication therebetween.

The other sample measurement devices 30 include kinds of measurement devices. Thus, kinds of measurements can be performed by the other sample measurement devices 30. In other words, the other sample measurement devices 30 include a second sample measurement device and a third sample measurement device configured to perform measurements different from each other.

Each robotic arm 11 is capable of transporting the container 41 or the rack 40 between the second sample measurement device and the third sample measurement device. In other words, the robotic arm 11 is capable of transporting the container 41 or the rack 40 between the other sample measurement devices 30. Accordingly, it is unnecessary to redundantly provide a dedicated device for passing over the container 41 or the rack 40 between the second sample measurement device and the third sample measurement device, which leads to a simplified device configuration.

The robotic arm 11 may sequentially transport the rack 40 housing samples to the other sample measurement devices 30 in accordance with a measurement order. The sample measurement system 200 may be provided with a device configured to sort the samples so that the containers 41 are collected to the rack 40 for each measurement order. The samples may be sorted by the robotic arm 11 to collect the containers 41 to the rack 40 for each measurement order.

(Table at Host Computer)

The following describes a control table held at the host computer 60 with reference to FIG. 22.

As illustrated in FIG. 22, the host computer 60 stores the sample ID, the measurement order, and the additional measurement order in association with one another to manage the measurement order of each of samples. The measurement order may be specified by the operator or may be determined by the host computer 60. The additional measurement order may be determined by the host computer 60 based on a measurement result.

For example, in a case of "a", the additional measurement order is a measurement order at the sample measurement device 20c. For example, blood cell measurement is performed at the sample measurement device 20c. In a case of "b", the additional measurement order is a measurement order at the sample measurement device 20d. For example, smear production is performed at the sample measurement device 20d. In a case of "c", the additional measurement order is a measurement order at each of the sample measurement devices 30d and 30e. For example, bacteria test measurement is performed at the sample measurement devices 30d and 30e. For example, CRP measurement is performed. In a case of "d", the additional measurement order is a measurement order at each of the sample measurement devices 30f and 30g. For example, hemoglobin A1C measurement is performed at the sample measurement devices 30f and 30g. In a case of "e", the additional measurement order is a measurement order at each of the sample measurement devices 30h and 30i. For example, red blood cell sedimentation speed measurement is performed at the sample measurement devices 30h and 30i.

(Table at Controller of Transport Unit)

The following describes a control table held at the controller 54 of the transport unit 50 with reference to FIG. 23.

As illustrated in FIG. 23, the controller 54 of the transport unit 50 stores the rack ID of the rack 40, the sample ID of a sample housed in the container 41, the additional measurement order, and the kind of a sample measurement device of the additional measurement order in association with one another.

(Table at Controller of Robotic Arm)

The following describes a control table held at the controller 13 of the robotic arm 11 with reference to FIG. 24.

As illustrated in FIG. 24, to control transport of the rack 40, the controller 13 of the robotic arm 11 stores the position information at each position, the priority level of each of the other sample measurement devices 30, and the number of times of transport thereto.

(Transport Processing Performed by Controller of Transport Unit)

Figure 25:
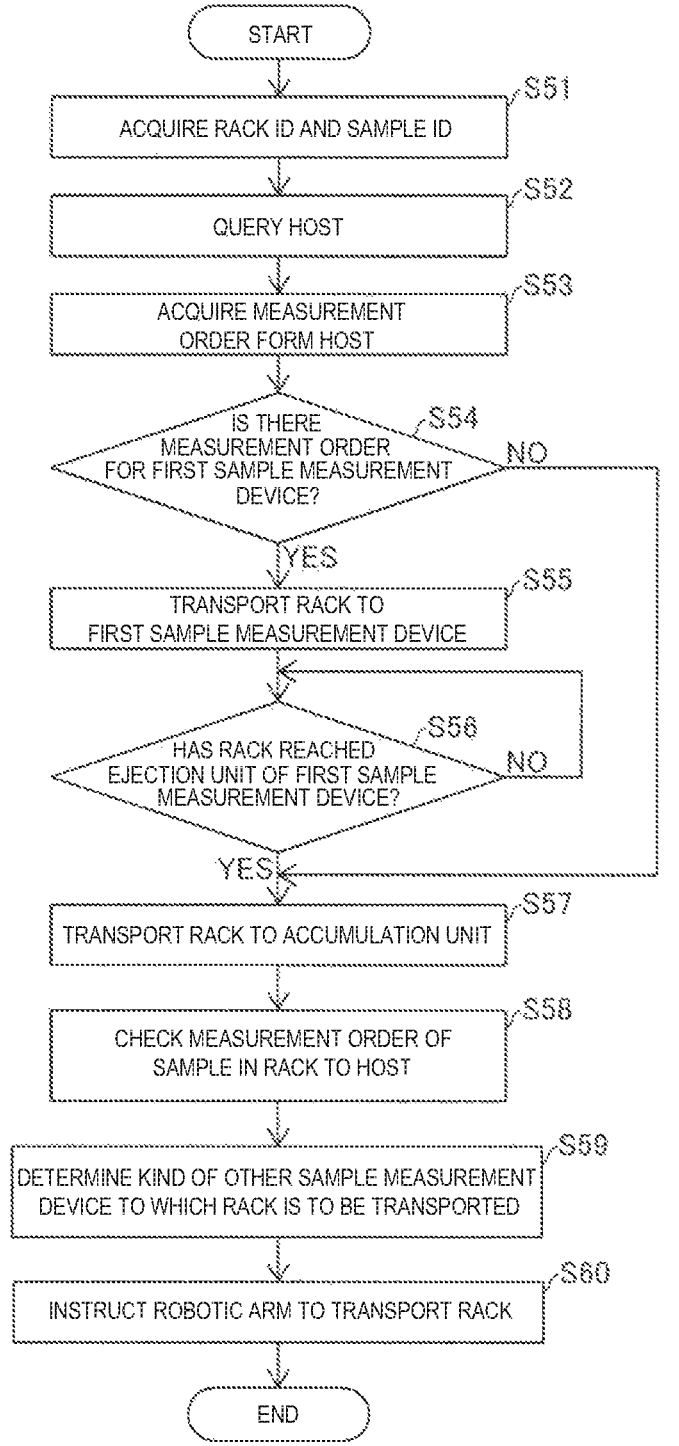
FIG. 25 is a flow diagram illustrating transport processing performed by a controller of a transport unit.

The following describes transport processing performed by the controller 54 of the transport unit 50 with reference to FIG. 25.

At step S51 in FIG. 25, the controller 54 of the transport unit 50 acquires a rack ID and a sample ID. The controller 54 records the acquired rack ID and sample ID in a table. At step S52, the controller 54 queries the host computer 60 for the measurement order of a sample having the acquired sample ID.

At step S53, the controller 54 acquires the measurement order from the host computer 60. At step S54, the controller 54 determines whether there is a measurement order for the first sample measurement device 20 based on the acquired measurement order. The process proceeds to step S55 when there is a measurement order for the sample measurement device, or proceeds to step S57 when there is no measurement order for the sample measurement device.

At step S55, the controller 54 performs control to transport the rack 40 to the first sample measurement device 20. At step S56, the controller 54 determines whether the rack 40 has reached the ejection unit 202 of the first sample measurement device 20. Specifically, the controller 54 determines whether measurement by the first sample measurement device 20 has ended and the rack 40 has been ejected to the ejection unit 202. The controller 54 repeats the determination at step S56 until the rack 40 is ejected.

After the rack 40 has been ejected, the controller 54 performs control to transport the rack 40 to the accumulation unit 53 at step S57. At step S58, the controller 54 checks the measurement order of a sample in the rack 40 to the host computer 60.

At step S59, the controller 54 determines the kind of the other sample measurement device 30 to which the rack 40 is to be transported based on the acquired measurement order. At step S60, the controller 54 instructs the robotic arm 11 to transport the rack 40. Thereafter, the transport processing is ended.

(Transport Processing Performed by Controller of Robotic Arm)

Figure 26:
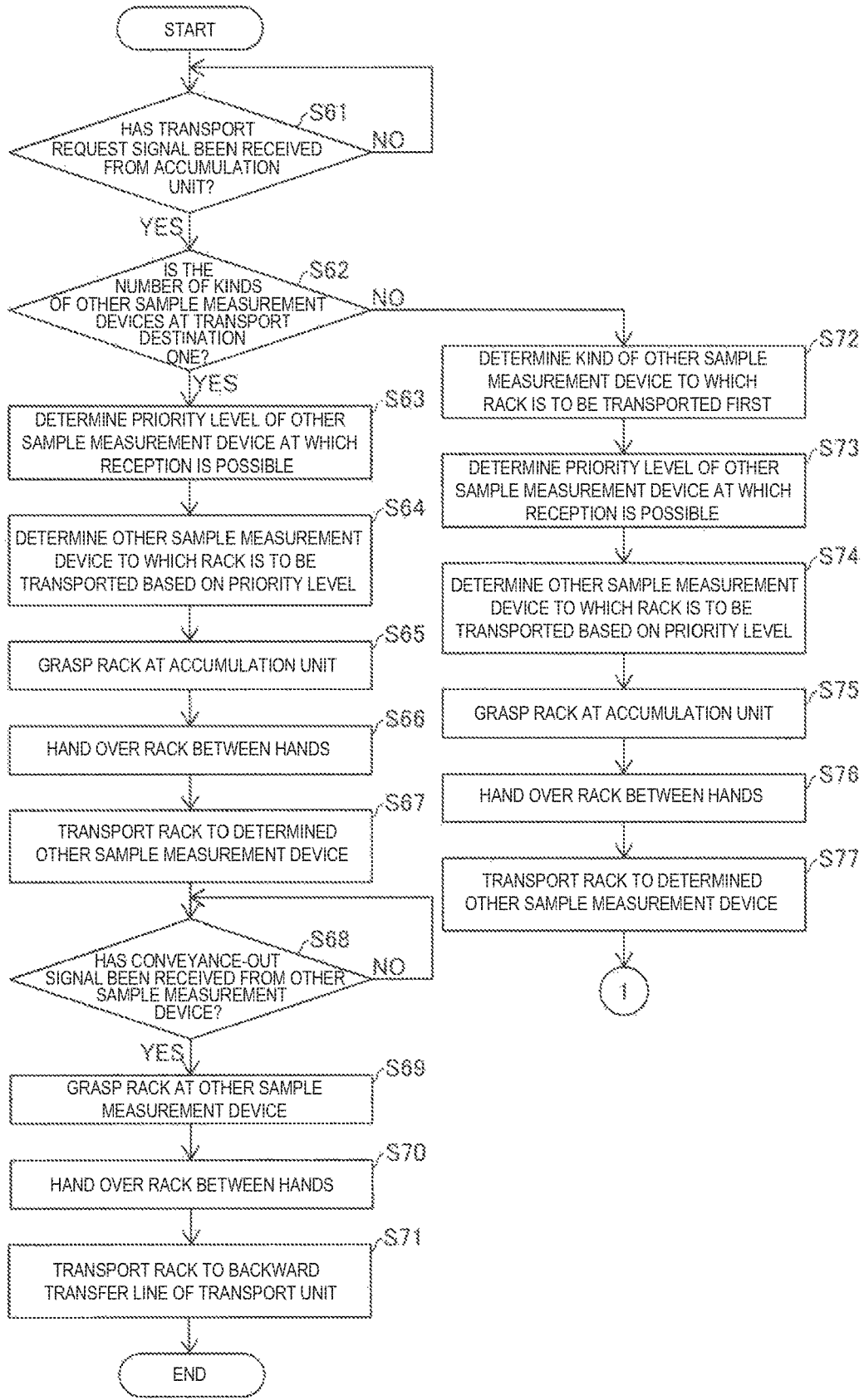
FIG. 26 is a first flow diagram illustrating transport processing performed by a controller of a robotic arm.
Figure 27:
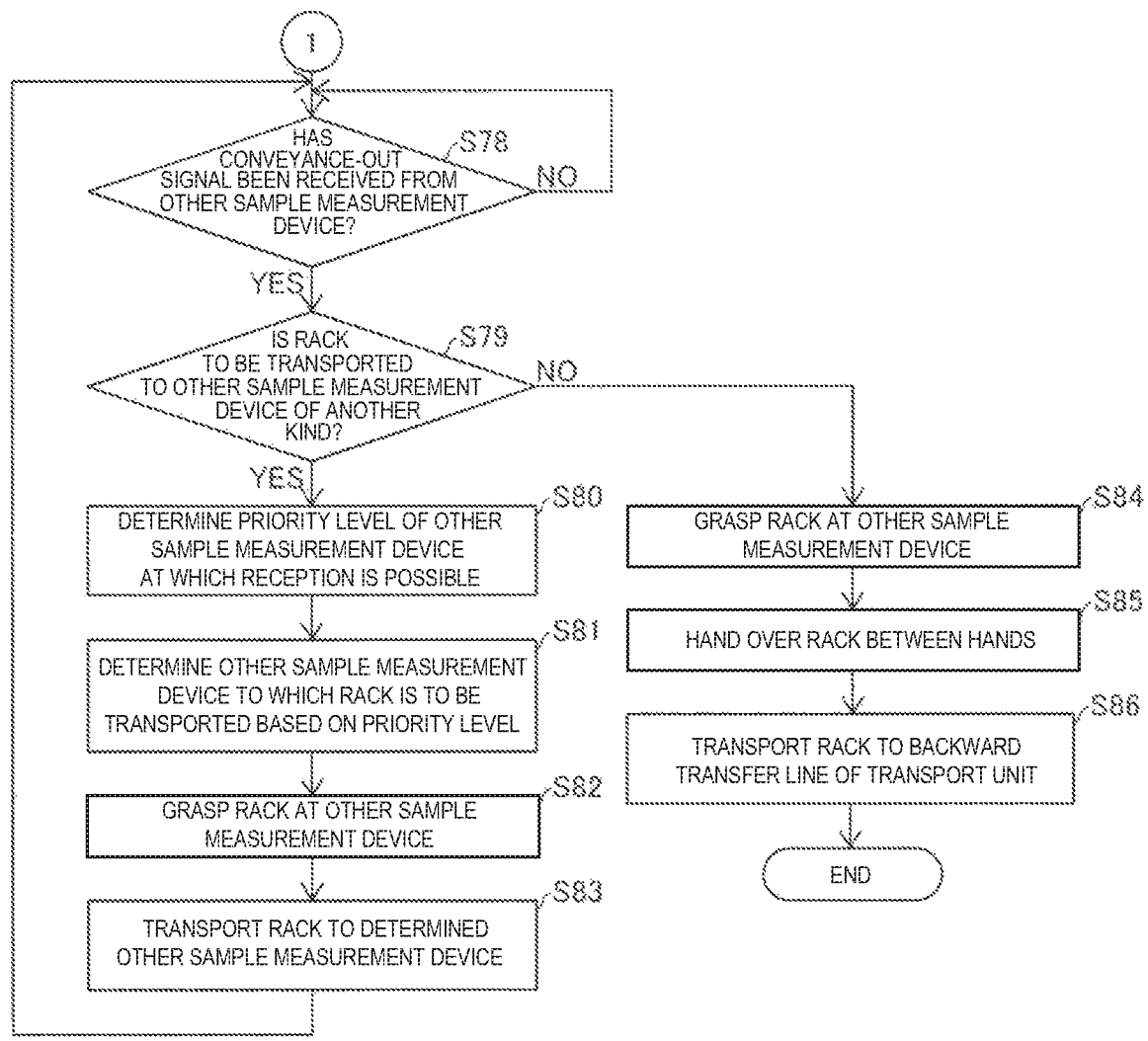
FIG. 27 is a second flow diagram illustrating transport processing performed by a controller of a robotic arm.
Figure 28:
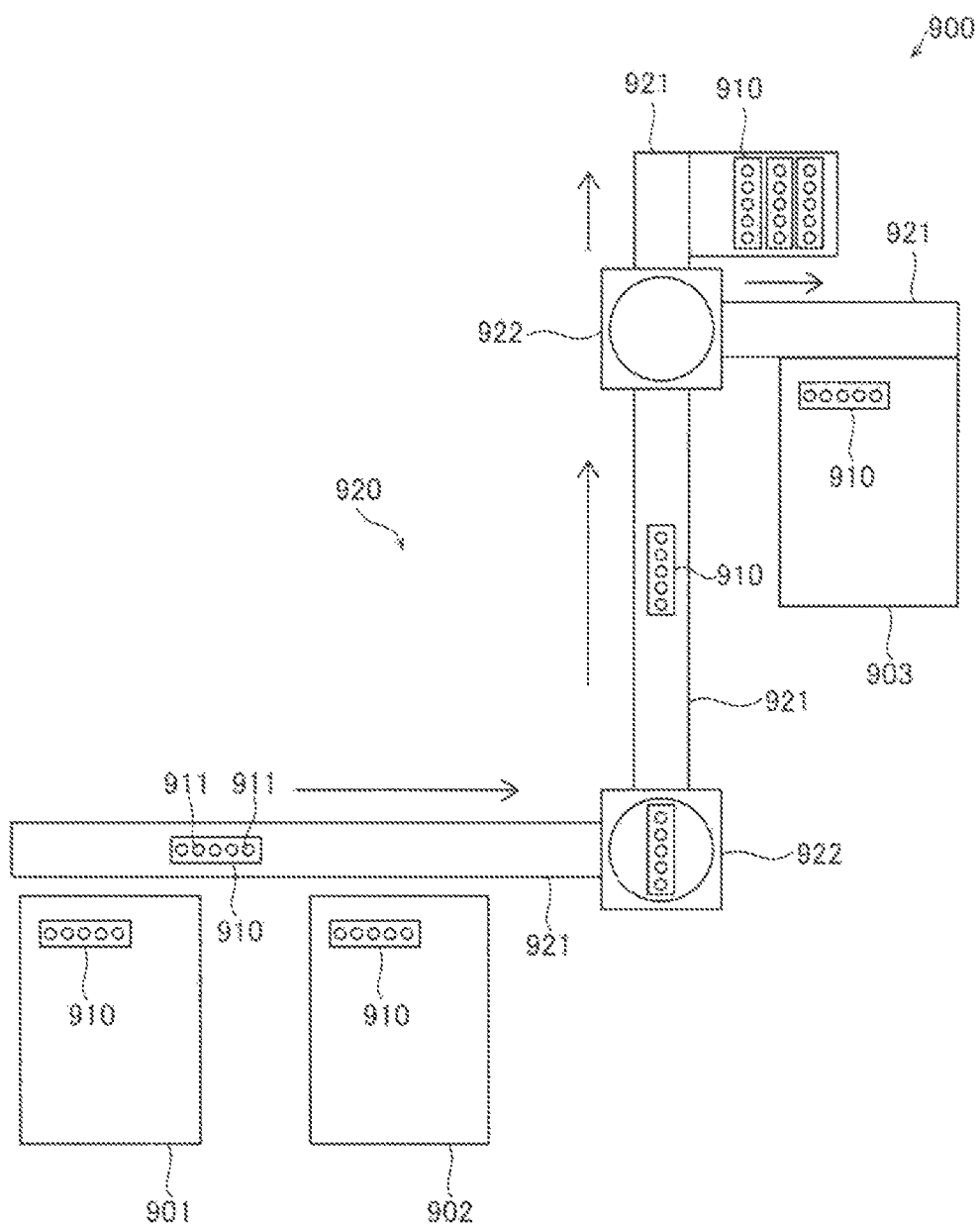
FIG. 28 is a diagram illustrating a transport device according to a conventional technology.

The following describes transport processing performed by the controller 13 of the robotic arm 11 with reference to FIGS. 26 and 27.

At step S61 in FIG. 26, the controller 13 of the robotic arm 11 determines whether a transport instruction has been received from the controller 54 of the transport unit 50. The controller 13 repeats the determination at step S61 until the transport instruction is received. When having received the transport instruction, the controller 13 determines whether the number of kinds of the other sample measurement devices 30 at the transport destination is one at step S62. The process proceeds to step S63 when the number of kinds is one, or proceeds to step S72 when the number of kinds is two or more.

At step S63, the controller 13 determines the priority levels of the other sample measurement devices 30 at which reception is possible. Specifically, the controller 13 determines the other sample measurement device 30 to which the rack 40 is to be transported based on the number of times of transport and the priority level in the table. At step S64, the controller 13 determines the other sample measurement device 30 to which the rack 40 is to be transported based on the priority level.

At step S65, the controller 13 performs control to grasp the rack 40 at the accumulation unit 53. Specifically, the controller 13 controls the first hand 114 of the first robotic arm 11a to grasp the rack 40 at the accumulation unit 53. At step S66, the controller 13 performs control to hand over the rack 40 from the first hand 114 to the second hand 115.

At step S67, the controller 13 performs control to transport the rack 40 to the determined other sample measurement device 30. Specifically, the controller 13 controls the second hand 115 of the second robotic arm 11b to transport the rack 40 to the supply unit 301 of the other sample measurement device 30. At step S68, the controller 13 determines whether a conveyance-out signal has been received from the other sample measurement devices 30. The controller 13 repeats the determination at step S68 until the conveyance-out signal is received.

When having received the conveyance-out signal, the controller 13 performs control to grasp the rack 40 at the other sample measurement device 30 at step S69. Specifically, the controller 13 controls the second hand 115 of the second robotic arm 11b to grasp the rack 40 at the ejection unit 302 of the other sample measurement device 30. At step S70, the controller 13 performs control to hand over the rack 40 from the second hand 115 to the first hand 114.

At step S71, the controller 13 performs control to transport the rack 40 to the backward transfer line 50b of the transport unit 50. Specifically, the controller 13 controls the first hand 114 of the first robotic arm 11a to transport the rack 40 to the backward transfer line 50b. Thereafter, the transport processing is ended.

At step S72, the controller 13 determines the kind of the other sample measurement device 30 to which the rack 40 is to be transported first. In this case, measurement may be performed first for the kind of the other sample measurement device 30 in a predetermined order, or may be performed first for the kind of the other sample measurement device 30 at which reception is possible.

At step S73, the controller 13 determines the priority levels of the other sample measurement devices 30 at which reception is possible. Specifically, the controller 13 determines the other sample measurement device 30 to which the rack 40 is to be transported based on the number of times of transport and the priority level in the table. At step S74, the controller 13 determines the other sample measurement device 30 to which the rack 40 is to be transported based on the priority level.

At step S75, the controller 13 performs control to grasp the rack 40 at the accumulation unit 53. Specifically, the controller 13 controls the first hand 114 of the first robotic arm 11a to grasp the rack 40 at the accumulation unit 53. At step S76, the controller 13 performs control to hand over the rack 40 from the first hand 114 to the second hand 115.

At step S77, the controller 13 performs control to transport the rack 40 to the determined other sample measurement device 30. Specifically, the controller 13 controls the second hand 115 of the second robotic arm 11b to transport the rack 40 to the supply unit 301 of the other sample measurement device 30. At step S78 in FIG. 27, the controller 13 determines whether a conveyance-out signal has been received from the other sample measurement devices 30. The controller 13 repeats the determination at step S78 until the conveyance-out signal is received.

At step S79, the controller 13 determines whether the rack 40 needs to be transported to any other sample measurement device 30 of another kind. The process proceeds to step S80 when the rack 40 needs to be transported, or proceeds to step S84 when no transport is needed. At step S80, the controller 13 determines the priority level of the other sample measurement devices 30 at which reception is possible. Specifically, the controller 13 determines the other sample measurement device 30 to which the rack 40 is to be transported based on the number of times of transport and the priority level in the table.

At step S81, the controller 13 determines the other sample measurement device 30 to which the rack 40 is to be transported based on the priority level. At step S82, the controller 13 performs control to grasp the rack 40 at the other sample measurement device 30. Specifically, the controller 13 controls the second hand 115 of the second robotic arm 11b to grasp the rack 40 at the ejection unit 302 of the other sample measurement device 30.

At step S83, the controller 13 performs control to transport the rack 40 to the determined other sample measurement device 30. Specifically, the controller 13 controls the second hand 115 of the second robotic arm 11b to transport the rack 40 to the supply unit 301 of the other sample measurement device 30. Thereafter, the process returns to step S78.

At step S84, the controller 13 performs control to grasp the rack 40 at the other sample measurement device 30. Specifically, the controller 13 controls the second hand 115 of the second robotic arm 11b to grasp the rack 40 at the ejection unit 302 of the other sample measurement device 30. At step S85, the controller 13 performs control to hand over the rack 40 from the second hand 115 to the first hand 114.

At step S86, the controller 13 performs control to transport the rack 40 to the backward transfer line 50b of the transport unit 50. Specifically, the controller 13 controls the first hand 114 of the first robotic arm 11a to transport the rack 40 to the backward transfer line 50b. Thereafter, the transport processing is ended.

Embodiments disclosed herein are illustrative but not restrictive in any way. The scope of the present invention is specified not by the above-described embodiments but by the claims, and further includes all changes (modifications) in meaning and range equivalent to the claims.

The invention claimed is:

1. A transport device that transports a container used in a sample measurement device or a rack housing the container, the sample measurement device comprising at least first sample measurement devices and other sample measurement devices different from the first sample measurement devices, the first sample measurement devices arrayed along a transport conveyer that extends in a first direction and is configured to convey the container or the rack along the first direction, the transport device comprising:
a robotic arm configured to transport the container or the rack in a horizontal direction and a vertical direction between an accumulation unit provided at an end of the transport conveyer and each of the other sample measurement devices; and
a controller comprising a processor configured with a program to perform operations comprising:
controlling the robotic arm to transport the container or the rack from the accumulation unit to one or more of the other sample measurement devices and return the container or the rack to the transport conveyer after measurement by the one or more of the other sample measurement devices.

2. The transport device according to claim 1, wherein the processor of the controller is configured with the program to perform operations such that controlling the robotic arm to transport the container or the rack comprises:
controlling the robotic arm based on position information of a transport source and a transport destination of the container or the rack.

3. The transport device according to claim 1, wherein the processor of the controller is configured with the program to perform operations further comprising:
receiving signals from the other sample measurement devices to control the robotic arm based on the received signals.

4. The transport device according to claim 1, wherein the processor of the controller is configured with the program to perform operations further comprising:
receiving a signal from an external control system to control the robotic arm based on the signal received from the external control system.

5. The transport device according to claim 4, wherein the processor of the controller is configured with the program to perform operations such that controlling the robotic arm to transport the container or the rack to the one or more of the other sample measurement devices comprises:
controlling the robotic arm to transport the container or the rack to the one or more of the other sample measurement devices based on transport destination information included in the signal received from the external control system.

6. The transport device according to claim 4, wherein the external control system controls the transport conveyer that transports the container or the rack to the first sample measurement devices.

7. The transport device according to claim 1, wherein the processor of the controller is configured with the program to perform operations further comprising:
determining, as a transport destination to which the container or the rack is to be transported, one of the other sample measurement devices, based on at least one of:
the number of times that each of the other sample measurement devices has been the transport destination; and
a priority level of each of the other sample measurement devices.

8. The transport device according to claim 7, wherein
in response to determining one sample measurement device having the smallest number of times of having been the transport destination among the other sample measurement devices, the processor of the controller is configured with the program to perform operations comprising: determining, as the transport destination to which the container or the rack is to be transported, the determined one sample measurement device, and
in response to determining two or more of the other sample measurement devices having the same smallest number of times of having been the transport destination among the other sample measurement devices, the processor of the controller is configured with the program to perform operations comprising: determining, as the transport destination to which the container or the rack is to be transported, one of the two or more of the other sample measurement devices having a top priority among the two or more of the other sample measurement devices.

9. The transport device according to claim 7, wherein in response to transporting the container or the rack to the other sample measurement device determined to be the transport destination, the processor of the controller is configured with the program to perform operations further comprising: lowering the priority level of the other sample measurement device determined to be the transport destination.

10. The transport device according to claim 1, wherein
the other sample measurement devices comprise at least a second sample measurement device and a third sample measurement device, and
the robotic arm is further configured to transport the container or the rack between the second sample measurement device and the third sample measurement device.

11. The transport device according to claim 1, wherein the other sample measurement devices perform measurement different from measurement performed by the first sample measurement devices.

12. The transport device according to claim 1, wherein the other sample measurement devices are arranged circumferentially around a base supporting the robotic arm.

13. The transport device according to claim 12, wherein each of the other sample measurement devices comprises a supply unit that faces the base and that supplies the container or the rack to each of the other sample measurement devices.

14. The transport device according to claim 1, wherein a base supporting the robotic arm is movable relative to an installation surface on which the first sample measurement devices and the other sample measurement devices are installed.

15. The transport device according to claim 14, wherein the base comprises:
a caster that causes the base to be movable relative to the installation surface; and
an expandable and contractable fixation leg, and
the base is fixed to the installation surface in response to expanding the fixation leg so that the caster does not contact the installation surface.

16. The transport device according to claim 1, wherein
the robotic arm comprises drive units, and
the processor of the controller is configured with the program to perform operations further comprising controlling drive of the drive units to transport the container or the rack based on position information of a transport source and a transport destination of the container or the rack.

17. The transport device according to claim 1, wherein the robotic arm comprises a hand in a replaceable manner, the hand being configured to grasp the container or the rack.

18. The transport device according to claim 1, wherein the robotic arm comprises:
a first hand configured to grasp the container or the rack from above; and
a second hand configured to grasp the container or the rack from side, and
the first hand and the second hand are selectively used.

19. A sample measurement system comprising:
first sample measurement devices arrayed along a transport conveyer extending in a first direction, wherein the transport conveyer is configured to convey a container or a rack housing the container along the first direction;
other sample measurement devices different from the first sample measurement devices; and
a transport device comprising:
a robotic arm configured to transport the container or the rack in a horizontal direction and a vertical direction between an accumulation unit provided at an end of the transport conveyer and each of the other sample measurement devices; and
a controller comprising a processor configured with a program to perform operations comprising controlling the robotic arm to transport the container or the rack from the accumulation unit to one or more of the other sample measurement devices and return the container or the rack to the transport conveyer after measurement by the one or more of the other sample measurement devices.

20. A transport method of transporting a container or a rack housing the container used in first sample measurement devices arrayed along a transport conveyer extending in a first direction and configured to convey the container or the rack along the first direction, the method comprising:
positioning a robotic arm and other sample measurement devices different from the first sample measurement devices in the vicinity of an accumulation unit provided at an end of the transport conveyer,
causing the robotic arm that is configured to grasp and transport the container or the rack in a horizontal direction and a vertical direction between the accumulation unit at the end of the transport conveyer and each of the other sample measurement devices, to transport the container or the rack from the accumulation unit at the end of the transport conveyer to one or more of the other sample measurement devices and return the container or the rack to the transport conveyer after measurement by the one or more of the other sample measurement devices.

* * * * *